(12) United States Patent
Zheng et al.

(10) Patent No.: US 10,565,230 B2
(45) Date of Patent: Feb. 18, 2020

(54) TECHNIQUE FOR PRESERVING EFFICIENCY FOR REPLICATION BETWEEN CLUSTERS OF A NETWORK

(71) Applicant: NetApp, Inc., Sunnyvale, CA (US)

(72) Inventors: Ling Zheng, Saratoga, CA (US); Michael L. Federwisch, San Jose, CA (US); Blake H. Lewis, Los Altos Hills, CA (US)

(73) Assignee: NetApp, Inc., Sunnyvale, CA (US)

( * ) Notice: Subject to any disclaimer, the term of this patent is extended or adjusted under 35 U.S.C. 154(b) by 586 days.

(21) Appl. No.: 14/876,460

(22) Filed: Oct. 6, 2015

(65) Prior Publication Data

US 2017/0032013 A1 Feb. 2, 2017

Related U.S. Application Data

(60) Provisional application No. 62/199,408, filed on Jul. 31, 2015.

(51) Int. Cl.
*G06F 16/27* (2019.01)
*G06F 16/11* (2019.01)
(Continued)

(52) U.S. Cl.
CPC .......... *G06F 16/275* (2019.01); *G06F 16/128* (2019.01); *G06F 16/24575* (2019.01); *G06F 16/285* (2019.01)

(58) Field of Classification Search
CPC ......... G06F 17/30581; G06F 17/30179; G06F 16/275
See application file for complete search history.

(56) References Cited

U.S. PATENT DOCUMENTS

| 5,937,425 A | 8/1999 | Ban |
| 7,249,150 B1 | 7/2007 | Watanabe et al. |

(Continued)

OTHER PUBLICATIONS

Cornwell, Michael, "Anatomy of a Solid-state Drive," ACM Queue—Networks, vol. 10, No. 10, Oct. 2012, pp. 1-7.

(Continued)

*Primary Examiner* — Jeff A Burke
*Assistant Examiner* — Dawaune A Conyers
(74) *Attorney, Agent, or Firm* — Cesari and McKenna, LLP

(57) ABSTRACT

A technique preserves efficiency for replication of data between a source node of a source cluster ("source") and a destination node of a destination cluster ("destination") of a clustered network. Replication in the clustered network may be effected by leveraging global in-line deduplication at the source to identify and avoid copying duplicate data from the source to the destination. To ensure that the copy of the data on the destination is synchronized with the data received at the source, the source creates a snapshot of the data for use as a baseline copy at the destination. Thereafter, new data received at the source that differs from the baseline snapshot are transmitted and copied to the destination. In addition, the source and destination nodes negotiate to establish a mapping of name-to-data when transferring data (i.e., an extent) between the clusters. Illustratively, the name is an extent key for the extent, such that the negotiated mapping established by the source and destination is based on the extent key associated with the extent.

18 Claims, 14 Drawing Sheets

(51) Int. Cl.
  *G06F 16/28*  (2019.01)
  *G06F 16/2457*  (2019.01)

(56) References Cited

U.S. PATENT DOCUMENTS

| | | | |
|---|---|---|---|
| 7,251,663 | B1 | 7/2007 | Smith |
| 7,395,352 | B1 | 7/2008 | Lam et al. |
| 7,464,125 | B1 | 12/2008 | Orszag et al. |
| 7,562,101 | B1 | 7/2009 | Jernigan et al. |
| 7,562,203 | B2 | 7/2009 | Scott et al. |
| 7,603,391 | B1 | 10/2009 | Federwisch et al. |
| 7,680,837 | B2 | 3/2010 | Yamato |
| 7,743,035 | B2 | 6/2010 | Chen et al. |
| 7,757,056 | B1 | 7/2010 | Fair |
| 7,873,619 | B1 | 1/2011 | Faibish et al. |
| 7,996,636 | B1 | 8/2011 | Prakash et al. |
| 8,082,390 | B1 | 12/2011 | Fan et al. |
| 8,099,396 | B1 | 1/2012 | Novick et al. |
| 8,205,065 | B2 | 6/2012 | Matze |
| 8,341,457 | B2 | 12/2012 | Spry et al. |
| 8,417,987 | B1 | 4/2013 | Goel et al. |
| 8,463,825 | B1 | 6/2013 | Harty et al. |
| 8,489,811 | B1 | 7/2013 | Corbett et al. |
| 8,495,417 | B2 | 7/2013 | Jernigan, IV et al. |
| 8,539,008 | B2 | 9/2013 | Faith et al. |
| 8,560,879 | B1 | 10/2013 | Goel |
| 8,577,850 | B1* | 11/2013 | Genda .................... G06F 3/0641 |
| | | | 707/692 |
| 8,595,595 | B1 | 11/2013 | Grcanac et al. |
| 8,600,949 | B2 | 12/2013 | Periyagaram et al. |
| 9,003,162 | B2 | 4/2015 | Lomet et al. |
| 9,037,544 | B1 | 5/2015 | Zheng et al. |
| 9,460,009 | B1* | 10/2016 | Taylor ................. G06F 12/0646 |
| | | | 711/114 |
| 2003/0120869 | A1 | 6/2003 | Lee et al. |
| 2003/0159007 | A1 | 8/2003 | Sawdon et al. |
| 2005/0144514 | A1 | 6/2005 | Ulrich et al. |
| 2007/0143359 | A1 | 6/2007 | Uppala |
| 2010/0042790 | A1 | 2/2010 | Mondal et al. |
| 2010/0088296 | A1 | 4/2010 | Periyagaram et al. |
| 2011/0035548 | A1 | 2/2011 | Kimmel et al. |
| 2011/0099342 | A1 | 4/2011 | Ozdemir |
| 2011/0213928 | A1 | 9/2011 | Grube et al. |
| 2012/0011176 | A1 | 1/2012 | Alzman |
| 2012/0290788 | A1 | 11/2012 | Klemm et al. |
| 2012/0317353 | A1* | 12/2012 | Webman .................. G06F 3/065 |
| | | | 711/108 |
| 2012/0317395 | A1* | 12/2012 | Segev ............... G06F 17/30578 |
| | | | 711/216 |
| 2013/0018854 | A1 | 1/2013 | Condict |
| 2013/0073519 | A1* | 3/2013 | Lewis ............... G06F 17/30215 |
| | | | 707/610 |
| 2013/0138862 | A1 | 5/2013 | Motwani et al. |
| 2013/0227236 | A1 | 8/2013 | Flynn et al. |
| 2013/0238832 | A1 | 9/2013 | Dronamraju et al. |
| 2013/0238932 | A1 | 9/2013 | Resch |
| 2013/0262805 | A1 | 10/2013 | Zheng et al. |
| 2013/0268497 | A1 | 10/2013 | Baldwin et al. |
| 2013/0346810 | A1 | 12/2013 | Kimmel et al. |
| 2014/0143213 | A1* | 5/2014 | Tal ..................... G06F 17/30156 |
| | | | 707/692 |
| 2015/0261792 | A1* | 9/2015 | Attarde ............. G06F 17/30303 |
| | | | 707/616 |
| 2015/0324236 | A1* | 11/2015 | Gopalan ............. G06F 11/1453 |
| | | | 711/162 |

OTHER PUBLICATIONS

"Cuckoo hashing," Wikipedia, http://en.wikipedia.org/wiki/Cuckoo_hash, Apr. 2013, pp. 1-5.
Culik, K., et al., "Dense Multiway Trees," ACM Transactions on Database Systems, vol. 6, Issue 3, Sep. 1981, pp. 486-512.
Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.
Gal, Eran et al., "Algorithms and Data Structures for Flash Memories," ACM Computing Surveys, vol. 37, No. 2, Jun. 2005, pp. 138-163.
Gray, Jim et al., "Flash Disk Opportunity for Server Applications," Queue—Enterprise Flash Storage, vol. 6, Issue 4, Jul.-Aug. 2008, pp. 18-23.
Handy, Jim, "SSSI Tech Notes: How Controllers Maximize SSD Life," SNIA, Jan. 2013, pp. 1-20.
Kagel, Art S., "two-way merge sort", Dictionary of Algorithms and Data Structures [online], May 2005 [retrieved on Jan. 28, 2015]. Retrieved from the Internet< URL: http://xlinux.nist.gov/dads/HTMUtwowaymrgsrt.html> (1 page).
Leventhal, Adam H., "A File System All Its Own," Communications of the ACM Queue, vol. 56, No. 5, May 2013, pp. 64-67.
Lim, H. et al., "SILT: A Memory-Efficient, High-Performance Key-Value Store," Proceedings of the 23rd ACM Symposium on Operating Systems Principles (SOSP'11), Oct. 23-26, 2011, pp. 1-13.
Moshayedi, Mark, et al., "Enterprise SSDs," ACM Queue—Enterprise Flash Storage, vol. 6 No. 4, Jul.-Aug. 2008, pp. 32-39.
O'Neil et al. The log-structured merge-tree (LSM-tree). Acta Informatica, 33. pp. 351-385. 1996.
Pagh, Rasmus, et al., "Cuckoo Hashing," Elsevier Science, Dec. 8, 2003, pp. 1-27.
Pagh, Rasmus, "Cuckoo Hashing for Undergraduates," IT University of Copenhagen, Mar. 27, 2006, pp. 1-6.
Rosenblum, Mendel, et al., "The Design and Implementation of a Log-Structured File System," Proceedings of the 13th ACM Symposium on Operating Systems Principles, Jul. 24, 1991, pp. 1-15.
Rosenblum, Mendel, et al., "The LFS Storage Manager," Summer '90 USENIX Technical Conference, Anaheim, California, Jun. 1990, pp. 1-16.
Rosenblum, Mendel, "The Design and Implementation of a Log-structured File System," UC Berkeley, Thesis, 1992, pp. 1-101.
Seltzer, Margo, et al., "An Implementation of a Log Structured File System for UNIX," Winter USENIX, San Diego, CA, Jan. 25-29, 1993, pp. 1-18.
Seltzer, Margo, et al., "File System Performance and Transaction Support," UC Berkeley, Thesis, 1992, pp. 1-131.
Smith, Kent, "Garbage Collection," SandForce, Flash Memory Summit, Santa Clara, CA, Aug. 2011, pp. 1-9.
Twigg, Andy, et al., "Stratified B-trees and Versioned Dictionaries," Proceedings of the 3rd USENIX Conference on Hot Topics in Storage and File Systems, vol. 11, 2011, pp. 1-5.
Wu, Po-Liang, et al., "A File-System-Aware FTL Design for Flash-Memory Storage Systems," Design, Automation & Test in Europe Conference & Exhibition, IEEE, 2009, pp. 1-6.

* cited by examiner

TECHNIQUE FOR PRESERVING EFFICIENCY FOR REPLICATION BETWEEN CLUSTERS OF A NETWORK

RELATED APPLICATION

The present application claims priority from commonly owned Provisional Patent Application No. 62/199,408, entitled TECHNIQUE FOR PRESERVING EFFICIENCY FOR REPLICATION BETWEEN CLUSTERS OF A NETWORK, filed on Jul. 31, 2015, the contents of which are incorporated herein by reference.

BACKGROUND

Technical Field

The present disclosure relates to replication of data between storage systems and, more specifically, to data replication between storage systems of different clusters.

Background Information

A plurality of storage systems may be interconnected as a cluster and configured to provide storage service relating to the organization of data stored on storage devices coupled to the systems. Each storage system may implement a high-level module, such as a file system, to logically organize the data stored on the devices as storage containers, such as volumes and/or logical units (LUNs). The storage systems of the cluster may cooperate to further provide a global-deduplication file system.

To improve reliability and facilitate recovery in the event of a failure of the storage system, some or all of the underlying data of the file system may be replicated (copied) to another storage system. For example, a source storage system may create a restorable image of its file system and transmit a copy of that image over a network to a destination storage system. The image may be updated with changes replicated to the destination storage system. However, duplicate data in the update may still be replicated to the destination storage system (i.e., data already at the destination may be included in the update). It is desirable to improve replication efficiency by not sending duplicate data when updating an image previously transmitted between source and destination storage systems.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
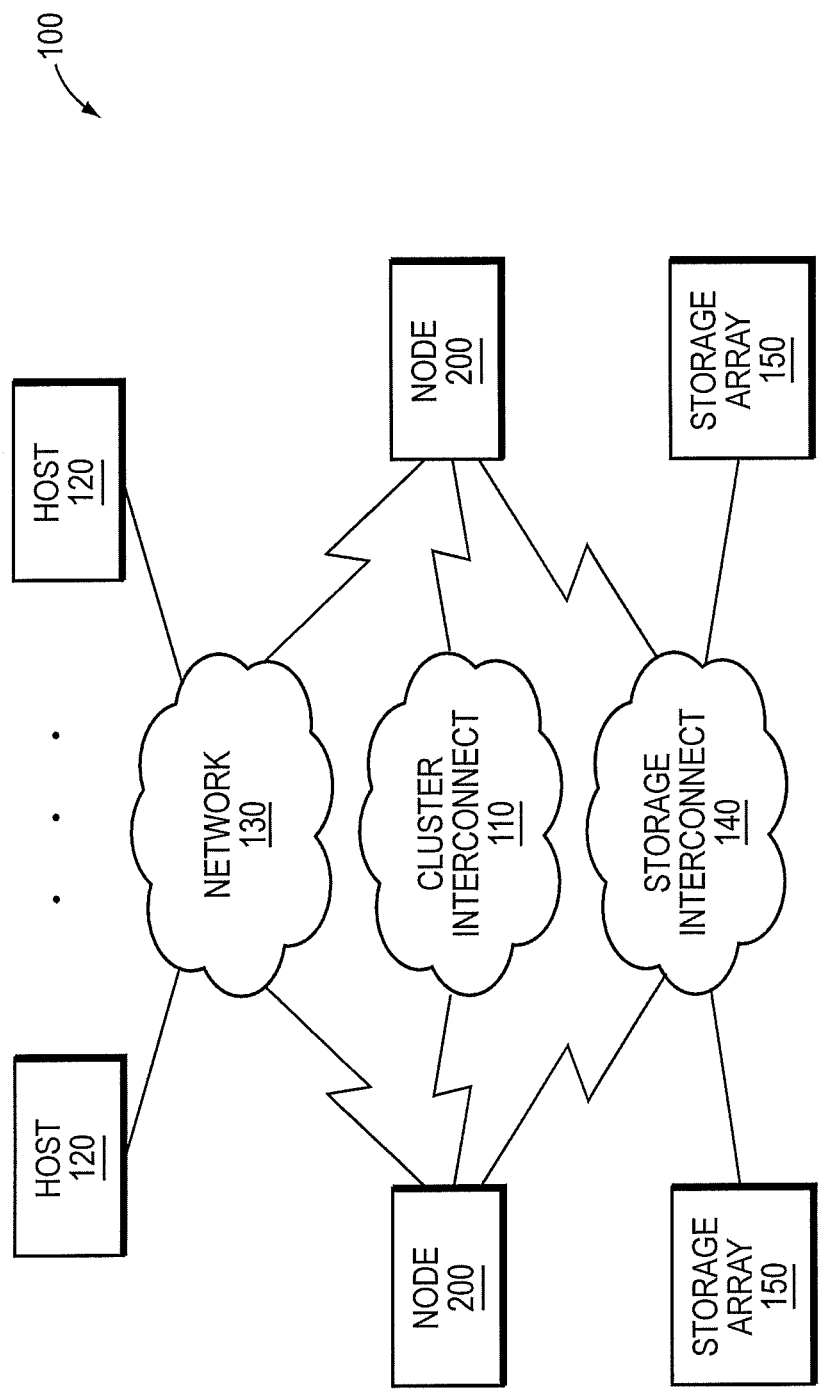
FIG. 1 is a block diagram of a plurality of nodes interconnected as a cluster.

The embodiments herein are directed to a technique for preserving efficiency for replication of data between a source node of a source cluster ("source") and a destination node of a destination cluster ("destination") of a clustered network. Data replication in the clustered network may be performed by leveraging global deduplication of the cluster to identify and avoid copying duplicate data from the source to the destination. To ensure that the copy of the data on the destination is synchronized with the data received at the source, the source may create a snapshot of the data for use as a baseline copy at the destination. Thereafter, new data received at the source that differs from the baseline snapshot (i.e., copy) are transmitted and copied to the destination. The new data may be data associated with one or more write requests (i.e., write data) issued by a host and directed to a logical block address range of a logical unit served by the source. The write data may be organized, e.g. aggregated, into one or more variable length blocks or extents, which may be de-duplicated. Illustratively, a hash function may be applied to each extent to generate an extent key that is stored in a key-value extent store (ES) embodied as a data structure, e.g., an ES hash table, of each cluster. The extent key is configured to reference a location of the extent on one or more storage devices, such as solid state drives of the cluster. As such, replication may occur between two different extent stores on different (e.g., source and destination) clusters, each using the same extent keys, i.e., a same hash function is used on both clusters.

To preserve efficiency during data replication, the nodes of the clusters may negotiate (e.g., during an initialization stage of replication) to ensure that the same hash function is used by the source and destination. In addition, the source and destination nodes may negotiate to establish a mapping of name-to-data when transferring data (i.e., an extent) between the clusters. Illustratively, the name is the extent key for the extent, such that the negotiated mapping established by the source and destination is based on the extent key associated with the extent. To avoid name collisions, the source sends the extent along with the extent key (i.e., name) to the destination for the first transfer of new data to verify the association (i.e., mapping) of the key to the extent. The destination accepts the mapping if it can use the extent key-to-extent association (i.e., as a new mapping or as a duplicate of an existing mapping). The mapping may be considered valid and in effect when the source and destination agree on the association, and may be considered invalid when, e.g., the extent is deleted by either the source or destination. The extent is considered duplicate when there is an existing mapping associated with the extent key of the extent.

In an embodiment, a replication field is provided within each entry of the ES hash table, wherein the replication field is associated on a per-cluster pair basis, e.g., between the source and destination clusters. The replication field of the ES hash table may include one or more replication bits organized as a bit plane, e.g., one byte (8 bits) per entry of the ES hash table, wherein each bit represents a per-cluster pair replication relationship, e.g., up to 8 replication relationships may be represented using a one byte replication field. Illustratively, each replication bit of the bit plane on the source is linked to a particular destination cluster, which may be indicated using an associated cluster identifier (ID), e.g., a first replication bit may correspond to destination cluster ID X and a second replication bit may correspond to destination cluster ID Y. That is, the first replication bit represents a "Source-X" per-cluster pair replication relationship, whereas the second replication bit represents a "Source-Y" per-cluster pair replication relationship. Accordingly, when the corresponding replication bits are asserted (e.g., set) for a given extent key in each ES hash table (i.e., in the source ES hash table and in the destination ES hash table), the source and destination agree that the same extent key is used for the same extent between the clusters. Any other arrangement of the replication bits (e.g., at least one bit unasserted) requires renegotiation between the source and the destination to establish the mapping of an extent key to the extent.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
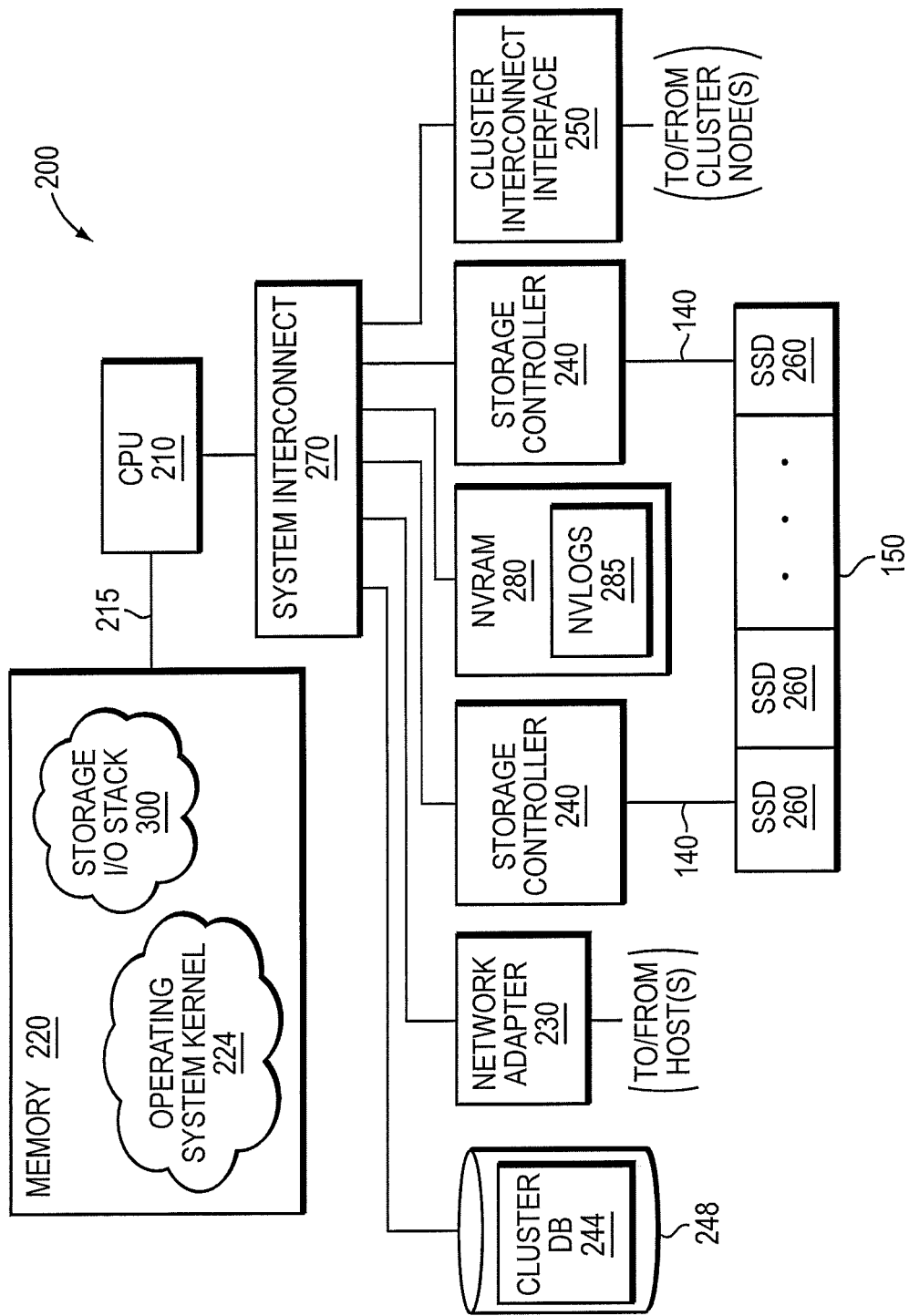
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Infiniband may be used as the clustering protocol and interconnect fabric media, although it will be apparent to those skilled in the art that other types of protocols and interconnects may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
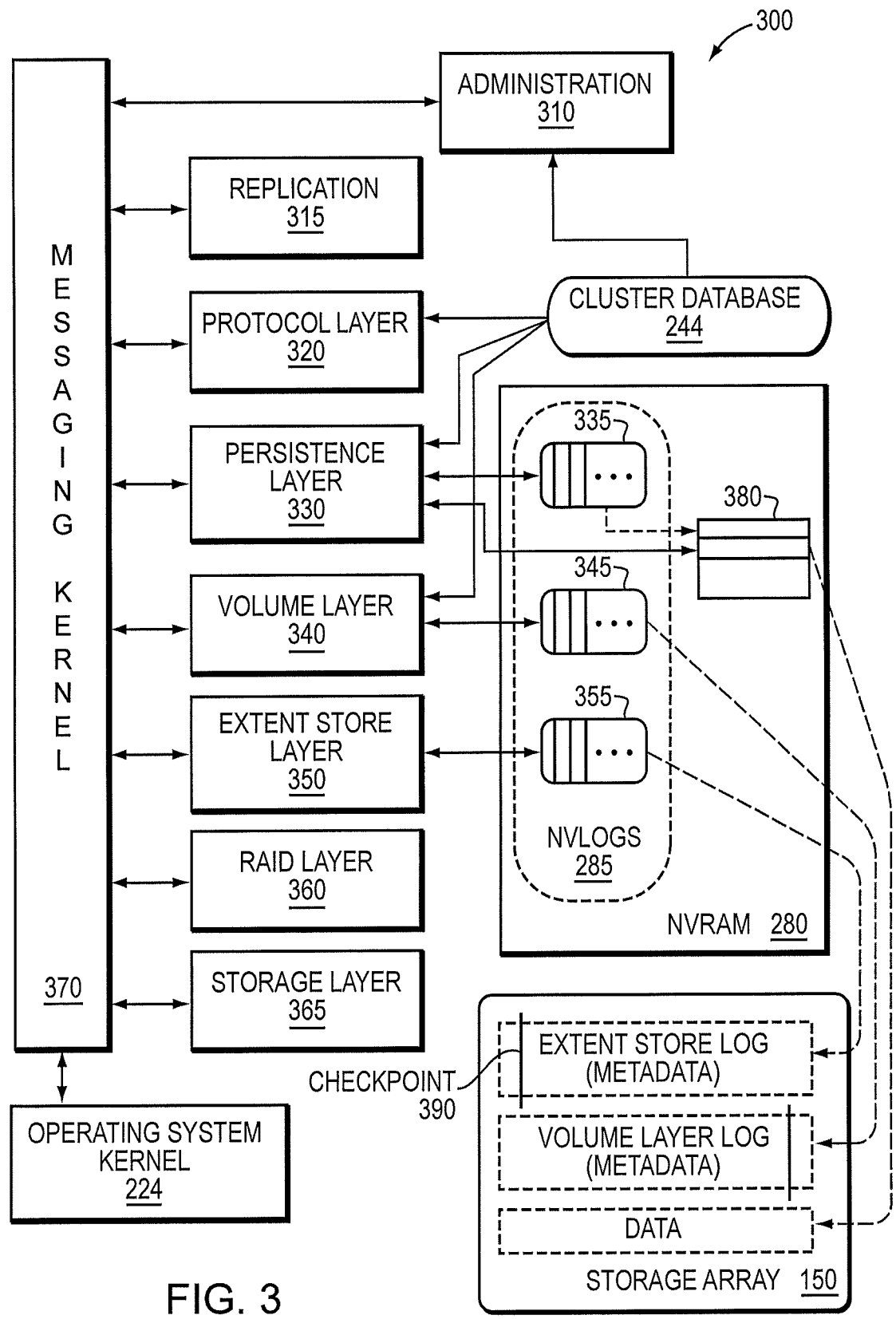
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a replication layer 315 (described later herein), a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers. Note that one or more of the layers, such as the administrative layer 310 and the replication layer 315, may execute asynchronously to the other layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in log fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. Notably, the write data for the write request may be physically stored in the log 355 such that the cache 380 contains the reference to the associated write data. That is, the write-back cache may be structured as a log. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the write data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset and length, hereinafter offset and range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the host provides distribution of extents among the storage containers and cluster-wide (across containers) de-duplication is infrequent. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with retirement of log entries, while a checkpoint (e.g., synchronization) operation stores in-core metadata on the array 150. That is, the checkpoint operation (checkpoint) ensures that a consistent state of metadata, as processed in-core, is committed to (stored on) the storage array 150; whereas the retirement of log entries ensures that the entries accumulated in the volume layer log 345 synchronize with the metadata checkpoints committed to the storage array 150 by, e.g., retiring those accumulated log entries prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). In an alternative embodiment, the extent store layer 350 is responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes that span multiple log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed and then, illustratively, for those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
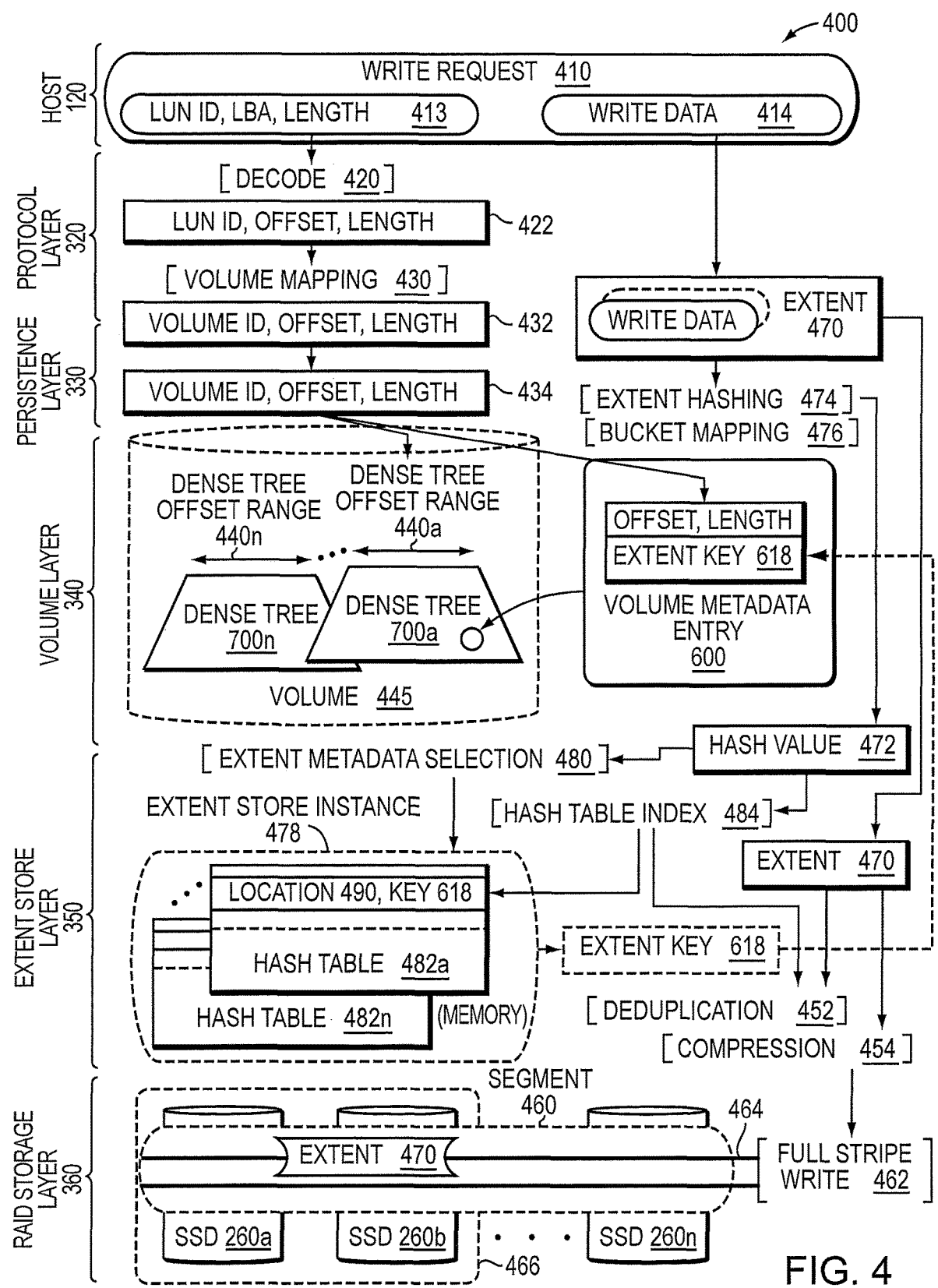
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. As described herein, the persistence layer 330 may aggregate and organize write data 414 from one or more write requests into a new extent 470 and perform a hash computation, i.e., a hash function, on the new extent to generate a hash value 472 in accordance with an extent hashing technique 474.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are evenly distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 478, and (ii) extracts a hash table index 484 from the hash value 472 to index into the selected hash table and lookup a table entry having an extent key 618 identifying a storage location 490 on SSD 260 for the extent. Accordingly, the persistence layer 330, the volume layer 340, or the cluster layer may contain computer executable instructions executed by the CPU 210 to perform operations that implement the extent metadata selection technique 480 described herein. If a table entry with a matching extent key is found, then the SSD location 490 mapped from the extent key 618 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 618 of the existing extent is passed to the appropriate volume layer instance for storage within an entry (denoted as volume metadata entry 600) of a dense tree metadata structure (e.g., dense tree 700a), such that the extent key 618 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripes 464 across the RAID group 466, illustratively as one or more full write stripe 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482n (i.e., as selected by the new candidate extent key) and (ii) passes a new extent key (denoted as extent key 618) to the appropriate volume layer instance for storage within an entry (also denoted as volume metadata entry 600) of a dense tree 700 managed by that volume layer instance, and (iii) records a change to extent metadata of the selected hash table in the extent store layer log 355. Illustratively, the volume layer instance selects dense tree 700a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 700. The volume layer instance then inserts the volume metadata entry 600 into the dense tree 700a and records a change corresponding to the volume metadata entry in the volume layer log 345. Accordingly, the I/O (write) request is sufficiently stored on SSD 260 of the cluster.

Read Path

Figure 5:
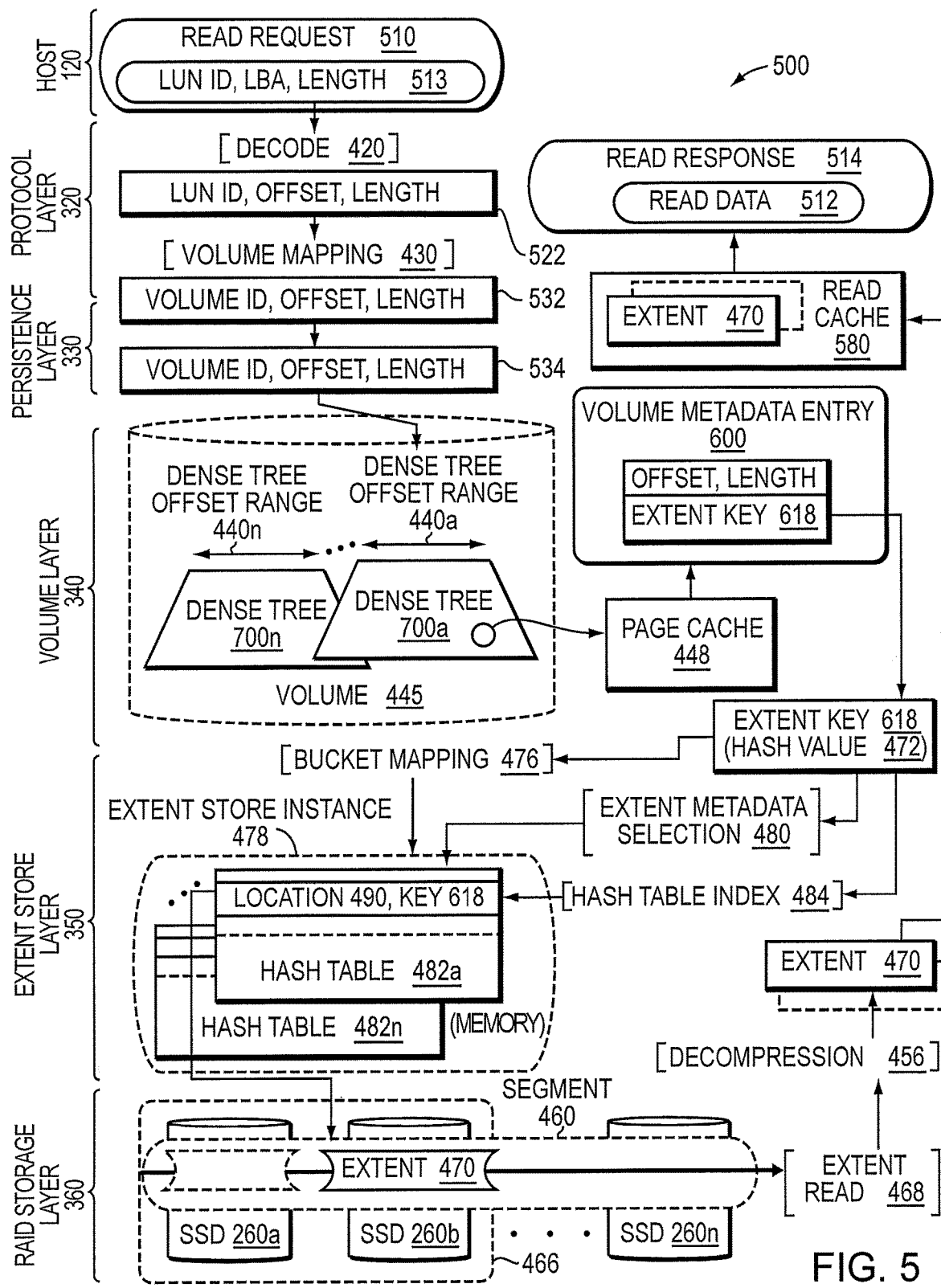
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be service from its cache data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure (e.g., dense tree 700a) associated with a region (e.g., offset range 440a) of a volume 445 that encompasses the requested offset range (specified by parameters 532). The volume layer instance may further process the read request to search for (lookup)

one or more volume metadata entries 600 of the dense tree 700a to obtain one or more extent keys 618 associated with one or more extents 470 within the requested offset range. As described further herein, each dense tree 700 may be embodied as multiple levels of a search structure with possibly overlapping offset range entries at each level. The entries, i.e., volume metadata entries 600, provide mappings from host-accessible LUN addresses, i.e., LBAs, to durable extent keys. The various levels of the dense tree may have volume metadata entries 600 for the same offset, in which case the higher level has the newer entry and is used to service the read request. A top level of the dense tree 700 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 600 of a level are found to ensure that the extent key(s) 618 for the entire requested read range are found. If no metadata entries exist for the entire or portions of the requested read range, then the missing portion(s) are zero filled.

Once found, each extent key 618 is processed by the volume layer 340 to, e.g., implement the bucket mapping technique 476 that translates the extent key to an appropriate extent store instance 478 responsible for storing the requested extent 470. Note that, in an embodiment, each extent key 618 may be substantially identical to the hash value 472 associated with the extent 470, i.e., the hash value as calculated during the write request for the extent, such that the bucket mapping 476 and extent metadata selection 480 techniques may be used for both write and read path operations. Note also that the extent key 618 may be derived from the hash value 472. The volume layer 340 may then pass the extent key 618 (i.e., the hash value from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 618 (i.e., hash value 472) to perform the extent metadata selection technique 480 that (i) selects an appropriate hash table (e.g., hash table 482a) from a set of hash tables within the extent store instance 478, and (ii) extracts a hash table index 484 from the extent key 618 (i.e., hash value 472) to index into the selected hash table and lookup a table entry having a matching extent key 618 that identifies a storage location 490 on SSD 260 for the extent 470. That is, the SSD location 490 mapped to the extent key 618 may be used to retrieve the existing extent (denoted as extent 470) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to a LBA range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA ranges of the LUN to data of the LUN (via extent keys) within the respective LBA range. In an embodiment, the volume layer organizes the volume metadata (embodied as volume metadata entries 600) as a data structure, i.e., a dense tree metadata structure (dense tree 700), which maps an offset range within the region to one or more extent keys. That is, the LUN data (user data) stored as extents (accessible via extent keys) is associated with LUN LBA ranges represented as volume metadata (also stored as extents).

Figure 6:
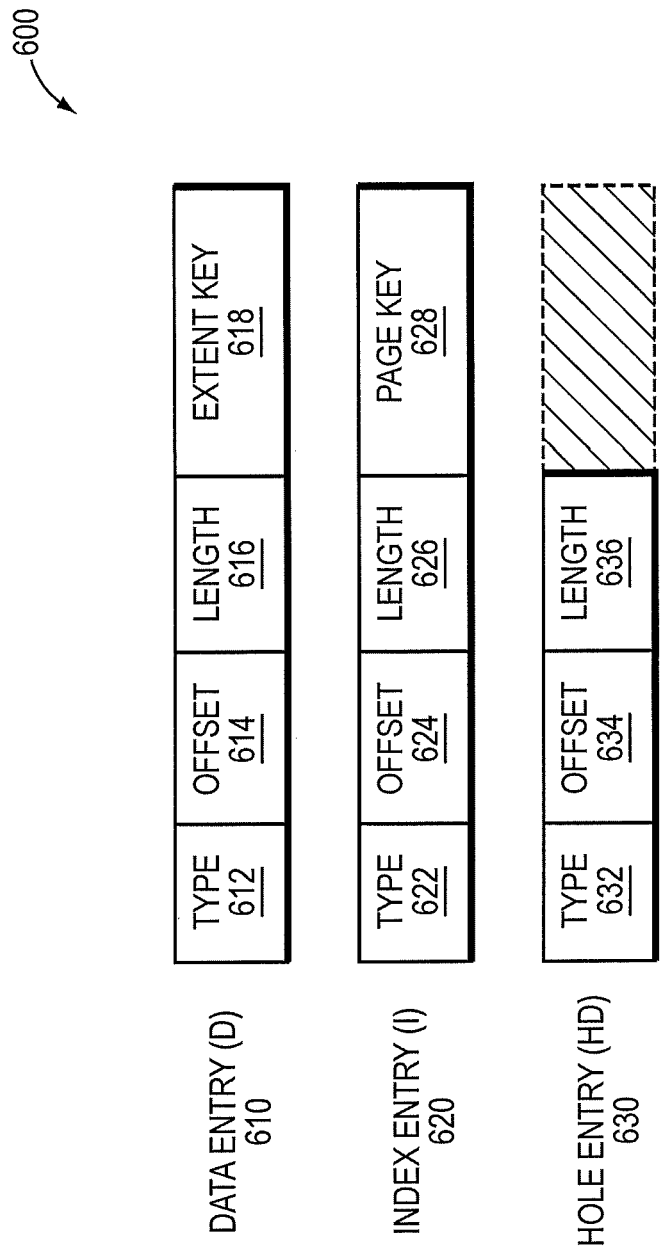
FIG. 6 is a block diagram of a volume metadata entry.

FIG. 6 is a block diagram of a volume metadata entry 600 of the dense tree metadata structure. Each volume metadata entry 600 of the dense tree 700 may be a descriptor that embodies one of a plurality of types, including a data entry (D) 610, an index entry (I) 620, and a hole entry (H) 630. The data entry (D) 610 is configured to map (offset, length) to an extent key for an extent (user data) and includes the following content: type 612, offset 614, length 616 and extent key 618. The index entry (I) 620 is configured to map (offset, length) to a page key (e.g., and extent key) of a metadata page (stored as an extent), i.e., a page containing one or more volume metadata entries, at a next lower level of the dense tree; accordingly, the index entry 620 includes the following content: type 622, offset 624, length 626 and page key 628. Illustratively, the index entry 620 manifests as a pointer from a higher level to a lower level, i.e., the index entry 620 essentially serves as linkage between the different levels of the dense tree. The hole entry (H) 630 represents absent data as a result of a hole punching operation at (offset, length) and includes the following content: type 632, offset 634, and length 636.

Figure 7:
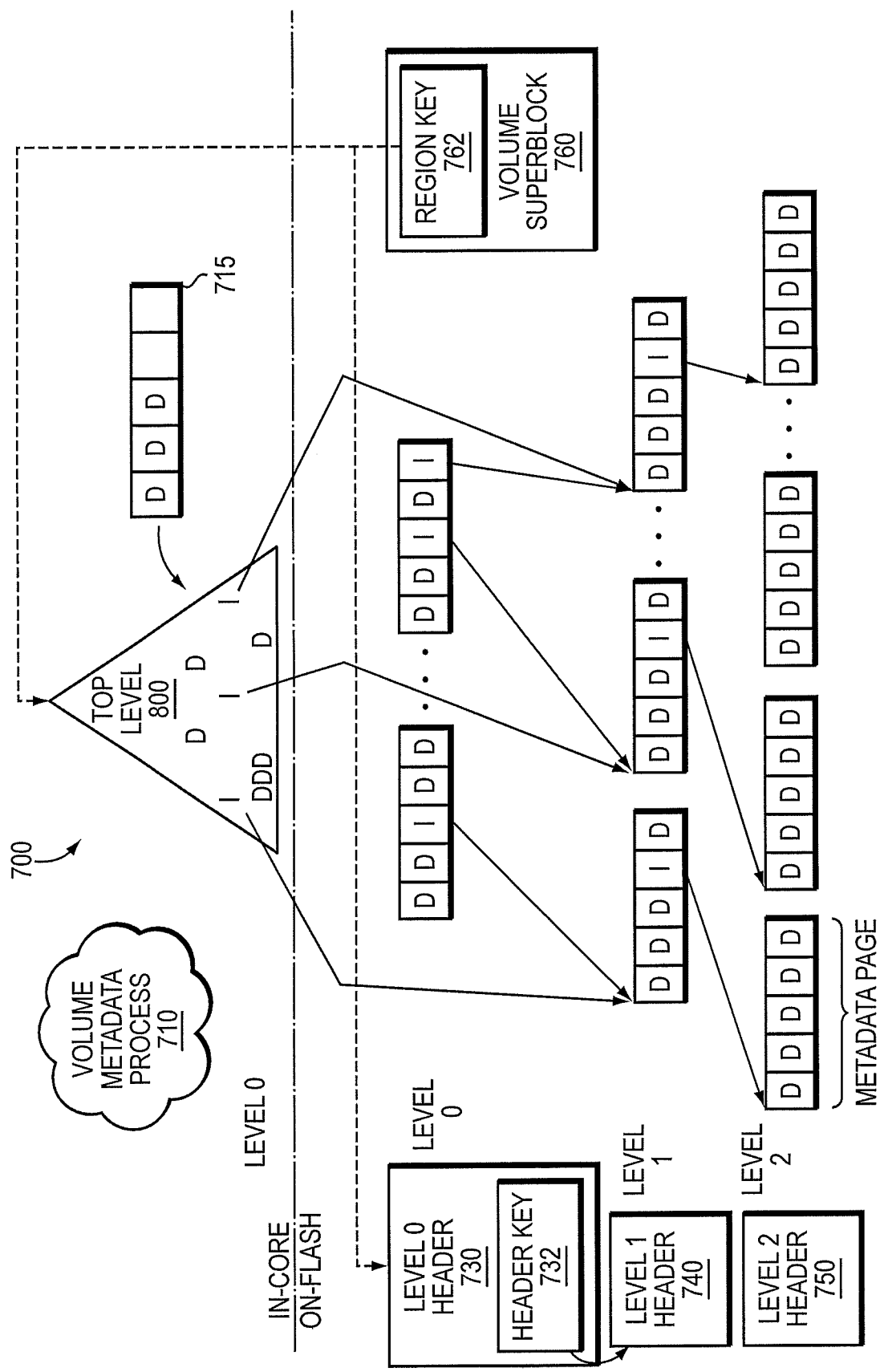
FIG. 7 is a block diagram of a dense tree metadata structure.

FIG. 7 is a block diagram of the dense tree metadata structure that may be advantageously used with one or more embodiments described herein. The dense tree metadata structure 700 is configured to provide mappings of logical offsets within a LUN (or volume) to extent keys managed by one or more extent store instances. Illustratively, the dense tree metadata structure is organized as a multi-level dense tree 700, where a top level 800 represents recent volume metadata changes and subsequent descending levels represent older changes. Specifically, a higher level of the dense tree 700 is updated first and, when that level fills, an adjacent lower level is updated, e.g., via a merge operation. A latest version of the changes may be searched starting at the top level of the dense tree and working down to the descending levels. Each level of the dense tree 700 includes fixed size records or entries, i.e., volume metadata entries 600, for storing the volume metadata. A volume metadata process 710 illustratively maintains the top level 800 of the dense tree in memory (in-core) as a balanced tree that enables indexing by offsets. The volume metadata process 710 also maintains a fixed sized (e.g., 4 KB) in-core buffer as a staging area (i.e., an in-core staging buffer 715) for volume metadata entries 600 inserted into the balanced tree (i.e., top level 800). Each level of the dense tree is further maintained on-flash as a packed array of volume metadata entries, wherein the entries are stored as extents illustratively organized as fixed sized (e.g., 4 KB) metadata pages 720. Notably, the staging buffer 715 is de-staged to SSD upon a trigger, e.g., the staging buffer is full. Each metadata page 720 has a unique identifier (ID) which guarantees that no two metadata pages can have the same content. Illustratively, metadata may not be de-m duplicated by the extent store layer 350.

In an embodiment, the multi-level dense tree 700 includes three (3) levels, although it will be apparent to those skilled in the art that additional levels N of the dense tree may be included depending on parameters (e.g., size) of the dense tree configuration. Illustratively, the top level 800 of the tree is maintained in-core as level 0 and the lower levels are maintained on-flash as levels 1 and 2. In addition, copies of the volume metadata entries 600 stored in staging buffer 715 may also be maintained on-flash as, e.g., a level 0 linked list. A leaf level, e.g., level 2, of the dense tree contains data entries 610, whereas a non-leaf level, e.g., level 0 or 1, may contain both data entries 610 and index entries 620. Each index entry (I) 620 at level N of the tree is configured to point to (reference) a metadata page 720 at level N+1 of the tree. Each level of the dense tree 600 also includes a header (e.g., level 0 header 730, level 1 header 740 and level 2 header 750) that contains per level information, such as reference counts associated with the extents. Each upper level header contains a header key (an extent key for the header, e.g., header key 732 of level 0 header 730) to a corresponding lower level header. A region key 762 to a root, e.g., level 0 header 730 (and top level 800), of the dense tree 700 is illustratively stored on-flash and maintained in a volume root extent, e.g., a volume superblock 760. Notably, the volume superblock 760 contains region keys to the roots of the dense tree metadata structures for all regions in a volume.

Figure 8:
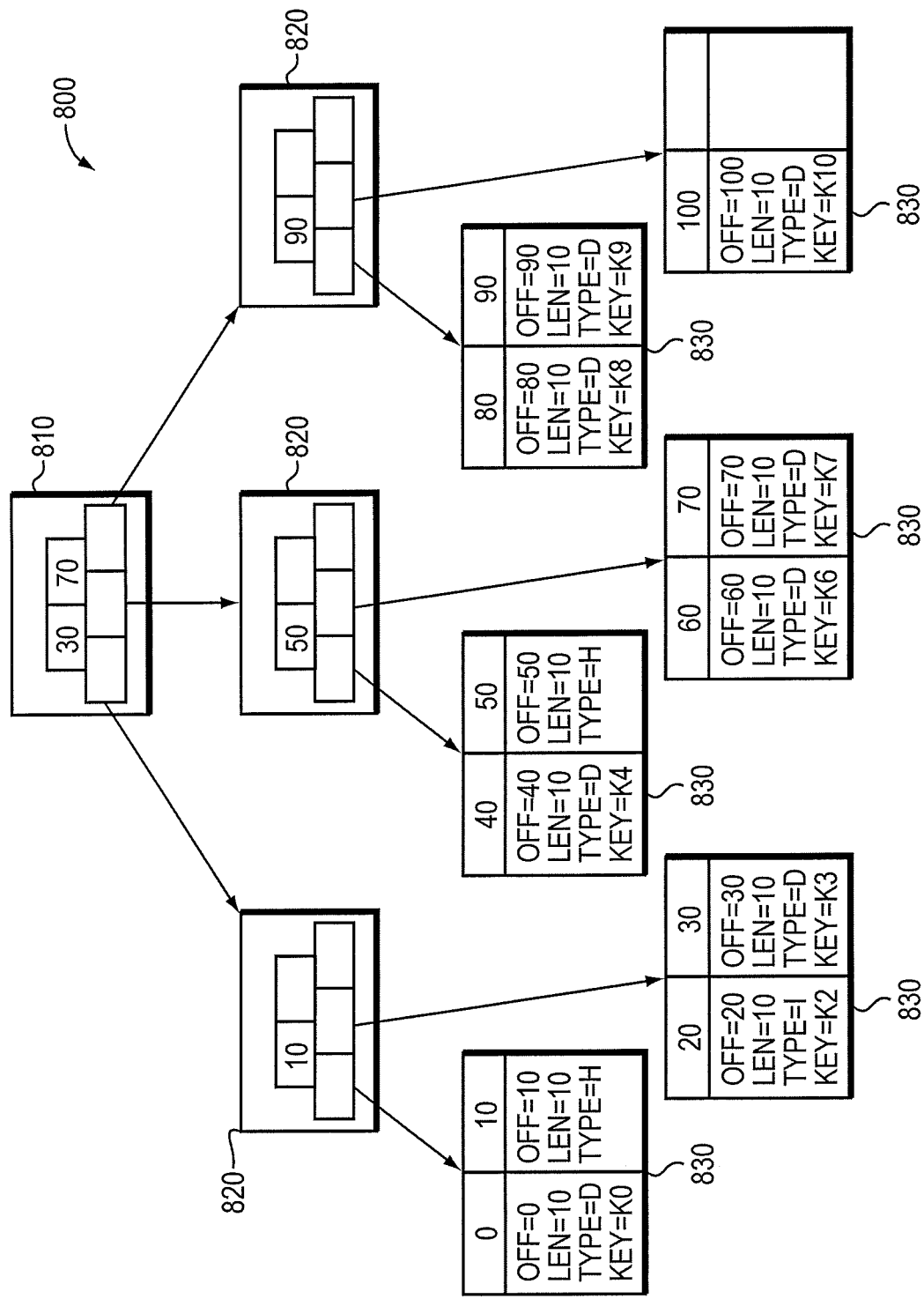
FIG. 8 is a block diagram of a top level of the dense tree metadata structure.

FIG. 8 is a block diagram of the top level 800 of the dense tree metadata structure. As noted, the top level (level 0) of the dense tree 700 is maintained in-core as a balanced tree, which is illustratively embodied as a B+ tree data structure. However, it will be apparent to those skilled in the art that other data structures, such as AVL trees, Red-Black trees, and heaps (partially sorted trees), may be advantageously used with the embodiments described herein. The B+ tree (top level 800) includes a root node 810, one or more internal nodes 820 and a plurality of leaf nodes (leaves) 830. The volume metadata stored on the tree is preferably organized in a manner that is efficient both to search in order to service read requests and to traverse (walk) in ascending order of offset to accomplish merges to lower levels of the tree. The B+ tree has certain properties that satisfy these requirements, including storage of all data (i.e., volume metadata entries 600) in leaves 830 and storage of the leaves as sequentially accessible, e.g., as one or more linked lists. Both of these properties make sequential read requests for write data (i.e., extents) and read operations for dense tree merge more efficient. Also, since it has a much higher fan-out than a binary search tree, the illustrative B+ tree results in more efficient lookup operations. As an optimization, the leaves 830 of the B+ tree may be stored in a page cache 448, making access of data more efficient than other trees. In addition, resolution of overlapping offset entries in the B+ tree optimizes read requests of extents. Accordingly, the larger the fraction of the B+ tree (i.e., volume metadata) maintained in-core, the less loading (reading) or metadata from SSD is required so as to reduce read amplification.

Figure 9:
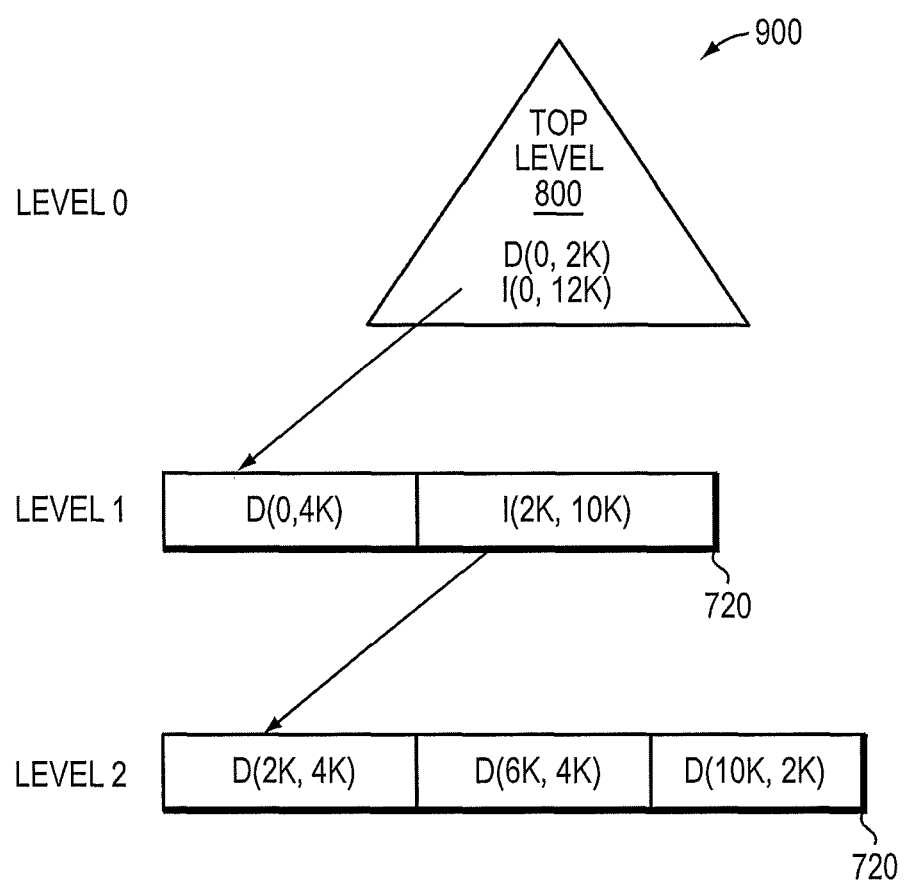
FIG. 9 illustrates mapping between levels of the dense tree metadata structure.

FIG. 9 illustrates mappings 900 between levels of the dense tree metadata structure. Each level of the dense tree 700 includes one or more metadata pages 720, each of which contains multiple volume metadata entries 600. In an embodiment, each volume metadata entry 600 has a fixed size, e.g., 12 bytes, such that a predetermined number of entries may be packed into each metadata page 720. As noted, the data entry (D) 610 is a map of (offset, length) to an address of (user) data which is retrievable using extent key 618 (i.e., from an extent store instance). The (offset, length) illustratively specifies an offset range of a LUN. The index entry (I) 620 is a map of (offset, length) to a page key 628 of a metadata page 720 at the next lower level. Illustratively, the offset in the index entry (I) 620 is the same as the offset of the first entry in the metadata page 720 at the next lower level. The length 626 in the index entry 620 is illustratively the cumulative length of all entries in the metadata page 720 at the next lower level (including gaps between entries).

For example, the metadata page 720 of level 1 includes an index entry "I(2K,10K)" that specifies a starting offset 2K and an ending offset 12K (i.e., 2K+10K=12K); the index entry (I) illustratively points to a metadata page 720 of level 2 covering the specified range. An aggregate view of the data entries (D) packed in the metadata page 720 of level 2 covers the mapping from the smallest offset (e.g., 2K) to the largest offset (e.g., 12K). Thus, each level of the dense tree 700 may be viewed as an overlay of an underlying level. For instance the data entry "D(0,4K)" of level 1 overlaps 2K of the underlying metadata in the page of level 2 (i.e., the range 2K,4K).

Figure 10:
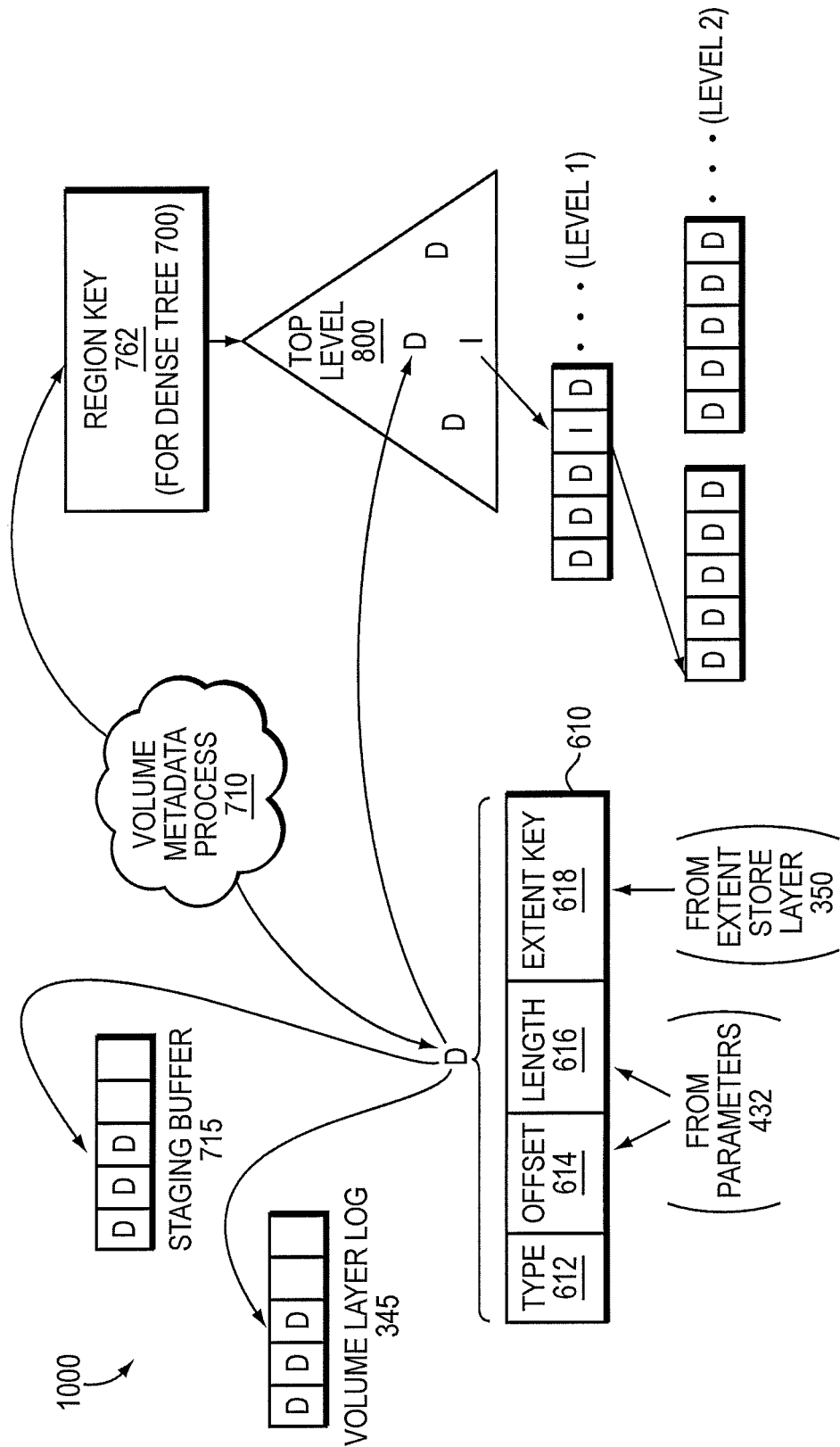
FIG. 10 illustrates a workflow for inserting a volume metadata entry into the dense tree metadata structure in accordance with a write request.

In one or more embodiments, operations for volume metadata managed by the volume layer 340 include insertion of volume metadata entries, such as data entries 610, into the dense tree 700 for write requests. As noted, each dense tree 700 may be embodied as multiple levels of a search structure with possibly overlapping offset range entries at each level, wherein each level is a packed array of entries (e.g., sorted by offset) and where leaf entries have an LBA range (offset, length) and extent key. FIG. 10 illustrates a workflow 1000 for inserting a volume metadata entry into the dense tree metadata structure in accordance with a write request. In an embodiment, volume metadata updates (changes) to the dense tree 700 occur first at the top level of the tree, such that a complete, top-level description of the changes is maintained in memory 220. Operationally, the volume metadata process 710 applies the region key 762 to access the dense tree 700 (i.e., top level 800) of an appropriate region (e.g., LBA range 440 as determined from the parameters 432 derived from the write request 410). Upon completion of a write request, the volume metadata process 710 creates a volume metadata entry, e.g., a new data entry 610, to record a mapping of offset/length-to-extent key (i.e., LBA range-to-user data). Illustratively, the new data entry 610 includes an extent key 618 (i.e., from the extent store layer 350) associated with data (i.e., extent 470) of the write request 410, as well as offset 614 and length 616 (i.e., from the write parameters 432) and type 612 (i.e., data entry D).

The volume metadata process 710 then updates the volume metadata by inserting (adding) the data entry D into the level 0 staging buffer 715, as well as into the top level 800 of dense tree 700 and the volume layer log 345. In the case of an overwrite operation, the overwritten extent and its mapping should be deleted. The deletion process is similar to that of hole punching (un-map). When the level 0 is full, i.e., no more entries can be stored, the volume metadata entries 600 from the level 0 in-core are merged to lower levels (maintained on SSD), i.e., level 0 merges to level 1 which may then merge to level 2 and so on (e.g., a single entry added at level 0 may trigger a merger cascade). Note, any entries remaining in the staging buffer 715 after level 0 is full also may be merged to lower levels. The level 0 staging buffer is then emptied to allow space for new entries 600.

Dense Tree Volume Metadata Checkpointing

When a level of the dense tree 700 is full, volume metadata entries 600 of the level are merged with the next lower level of the dense tree. As part of the merge, new index entries 620 are created in the level to point to new lower level metadata pages 720, i.e., data entries from the level are merged (and pushed) to the lower level so that they may be "replaced" with an index reference in the level. The top level 800 (i.e., level 0) of the dense tree 700 is illustratively maintained in-core such that a merge operation to level 1 facilitates a checkpoint to SSD 260. The lower levels (i.e., levels 1 and/or 2) of the dense tree are illustratively maintained on-flash and updated (e.g., merged) as a batch operation (i.e., processing the entries of one level with those of a lower level) when the higher levels are full. The merge operation illustratively includes a sort, e.g., a 2-way merge sort operation. A parameter of the dense tree 700 is the ratio K of the size of level N−1 to the size of level N. Illustratively, the size of the array at level N is K times larger than the size of the array at level N−1, i.e., sizeof(level N)=K*sizeof(level N−1). After K merges from level N−1, level N becomes full (i.e., all entries from a new, fully-populated level N−1 are merged with level N, iterated K times.)

Figure 11:
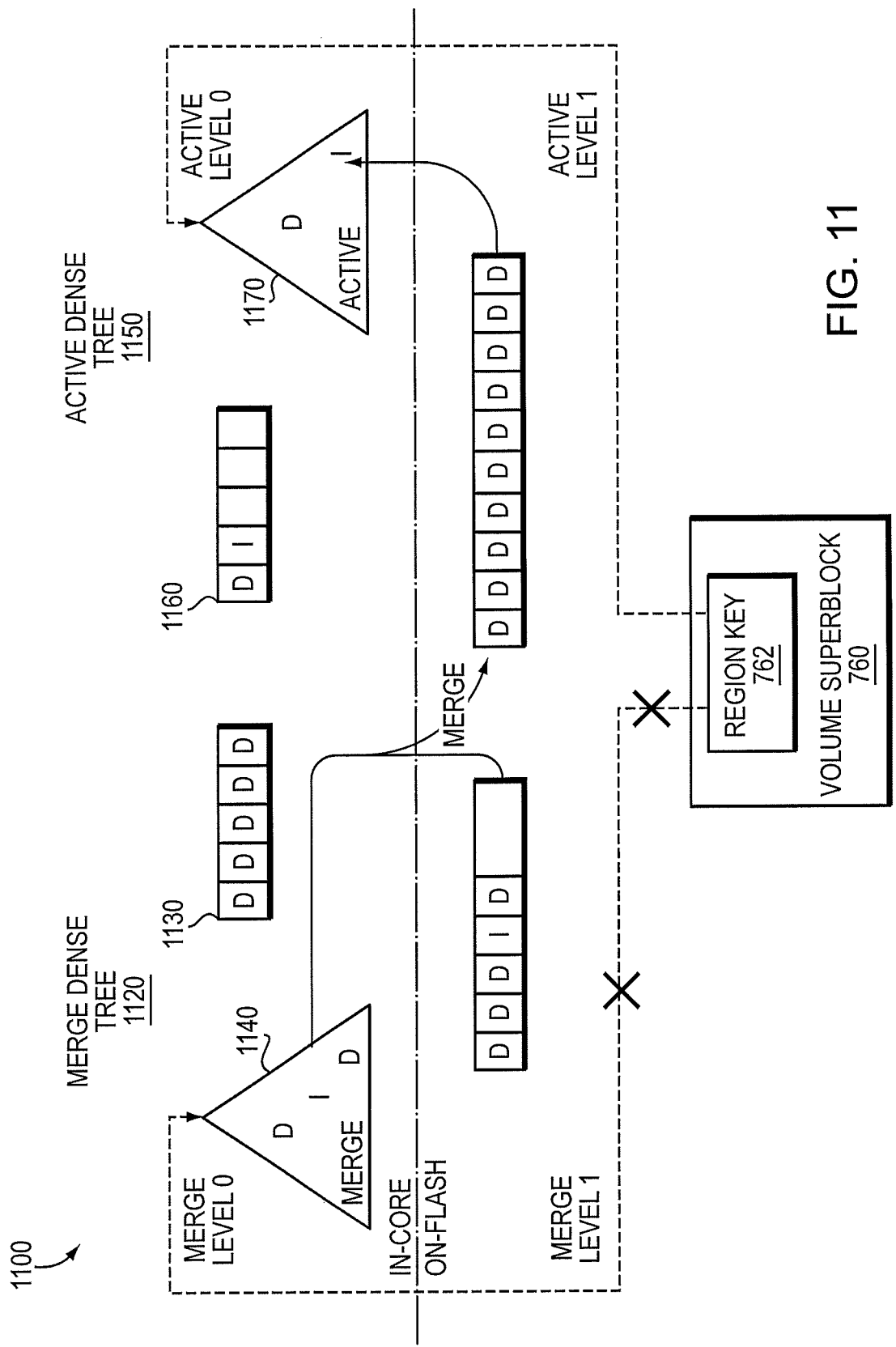
FIG. 11 illustrates merging between levels of the dense tree metadata structure.

FIG. 11 illustrates merging 1100 between levels, e.g., levels 0 and 1, of the dense tree metadata structure. In an embodiment, a merge operation is triggered when level 0 is full. When performing the merge operation, the dense tree metadata structure transitions to a "merge" dense tree structure (shown at 1120) that merges, while an alternate "active" dense tree structure (shown at 1150) is utilized to accept incoming data. Accordingly, two in-core level 0 staging buffers 1130, 1160 are illustratively maintained for concurrent merge and active (write) operations, respectively. In other words, an active staging buffer 1160 and active top level 1170 of active dense tree 1150 handle in-progress data flow (i.e, active user read and write requests), while a merge staging buffer 1130 and merge top level 1140 of merge dense tree 1120 handle consistency of the data during a merge operation. That is, a "double buffer" arrangement may be used to maintain consistency of data (i.e., entries in the level 0 of the dense tree) while processing active operations.

During the merge operation, the merge staging buffer 1130, as well as the top level 1140 and lower level array (e.g., merge level 1) are read-only and are not modified. The active staging buffer 1160 is configured to accept the incoming (user) data, i.e., the volume metadata entries received from new put operations are loaded into the active staging buffer 1160 and added to the top level 1170 of the active dense tree 1150. Illustratively, merging from level 0 to level 1 within the merge dense tree 1120 results in creation of a new active level 1 for the active dense tree 1150, i.e., the resulting merged level 1 from the merge dense tree is inserted as a new level 1 into the active dense tree. A new index entry I is computed to reference the new active level 1 and the new index entry I is loaded into the active staging buffer 1160 (as well as in the active top level 1170). Upon completion of the merge, the region key 762 of volume superblock 760 is updated to reference (point to) the root, e.g., active top level 1170 and active level 0 header (not shown), of the active dense tree 1150, thereby deleting (i.e., rendering inactive) merge level 0 and merge level 1 of the merge dense tree 1120. The merge staging buffer 1130 thus becomes an empty inactive buffer until the next merge. The merge data structures (i.e., the merge dense tree 1120 including staging buffer 1130) may be maintained in-core and "swapped" as the active data structures at the next merge (i.e., "double buffered").

Snapshot and Clones

As noted, the LUN ID and LBA (or LBA range) of an I/O request are used to identify a volume (e.g., of a LUN) to which the request is directed, as well as the volume layer (instance) that manages the volume and volume metadata associated with the LBA range. Management of the volume and volume metadata may include data management functions, such as creation of snapshots and clones, for the LUN. Illustratively, the snapshots and clones may be represented as independent volumes accessible by host 120 as LUNs, and embodied as respective read-only copies, i.e., snapshots, and read-write copies, i.e., clones, of the volume (hereinafter "parent volume") associated with the LBA range. The volume layer 340 may interact with other layers of the storage I/O stack 300, e.g., the persistence layer 330 and the administration layer 310, to manage both administration aspects, e.g., snapshot/clone creation, of the snapshot and clone volumes, as well as the volume metadata, i.e., in-core mappings from LBAs to extent keys, for those volumes. Accordingly, the administration layer 310, persistence layer 330, and volume layer 340 contain computer executable instructions executed by the CPU 210 to perform operations that create and manage the snapshots and clones described herein.

In one or more embodiments, the volume metadata managed by the volume layer, i.e., parent volume metadata and snapshot/clone metadata, is illustratively organized as one or more multi-level dense tree metadata structures, wherein each level of the dense tree metadata structure (dense tree) includes volume metadata entries for storing the metadata. Each snapshot/clone may be derived from a dense tree of the parent volume (parent dense tree) to thereby enable fast and efficient snapshot/clone creation in terms of time and consumption of metadata storage space. To that end, portions (e.g., levels or volume metadata entries) of the parent dense tree may be shared with the snapshot/clone to support time and space efficiency of the snapshot/clone, i.e., portions of the parent volume divergent from the snapshot/clone volume are not shared. Illustratively, the parent volume and clone may be considered "active," in that each actively processes (i.e., accepts) additional I/O requests which modify or add (user) data to the respective volume; whereas a snapshot is read-only and, thus, does not modify volume (user) data, but may still process non-modifying I/O requests (e.g., read requests).

Figure 12:
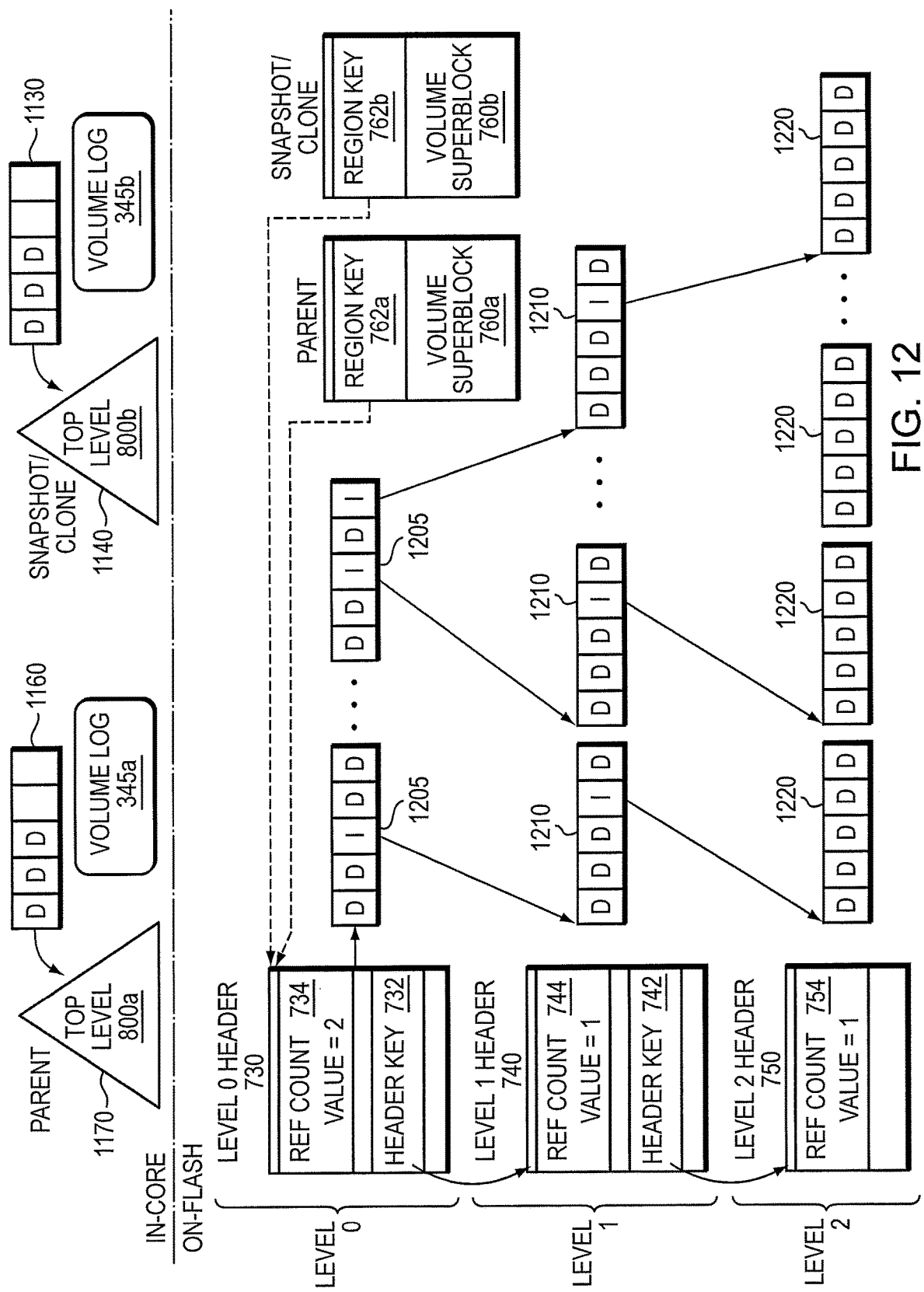
FIG. 12 is a block diagram of a dense tree metadata structure shared between a parent volume and snapshot/clone.

FIG. 12 is a block diagram of a dense tree metadata structure shared between a parent volume and a snapshot/clone. In an embodiment, creation of a snapshot/clone may include copying an in-core portion of the parent dense tree to a dense tree of the snapshot/clone (snapshot/clone dense tree). That is, the in-core level 0 staging buffer and in-core top level of the parent dense tree may be copied to create the in-core portion of the snapshot/clone dense tree, i.e., parent staging buffer 1160 may be copied to create snapshot/clone staging buffer 1130, and top level 800*a* (shown at 1170) may be copied to create snapshot/clone top level 800*b* (shown at 1140). Note that although the parent volume layer log 345*a* may be copied to create snapshot/clone volume layer log 345*b*, the volume metadata entries of the parent volume log 345*a* recorded (i.e., logged) after initiation of snapshot/clone creation may not be copied to the log 345*b*, as those entries may be directed to the parent volume and not to the snapshot/clone. Lower levels of the parent dense tree residing on SSDs may be initially shared between the parent volume and snapshot/clone. As the parent volume and snapshot/clone diverge, the levels may split to accommodate new data. That is, as new volume metadata entries are written to a level of the parent dense tree, that level is copied (i.e., split) to the snapshot/clone dense tree so that the parent dense tree may diverge from its old (now copied to the snapshot/clone) dense tree structure.

A reference counter may be maintained for each level of the dense tree, illustratively within a respective level header (reference counters 734, 744, 754) to track sharing of levels between the volumes (i.e., between the parent volume and snapshot/clone). Illustratively, the reference counter may increment when levels are shared and decremented when levels are split (e.g., copied). For example, a reference count value of 1 may indicate an unshared level (i.e., portion) between the volumes (i.e., has only one reference). In an embodiment, volume metadata entries of a dense tree do not store data, but only reference data (as extents) stored on the storage array 150 (e.g., on SSDs 260). Consequently, more than one level of a dense tree may reference the same extent (data) even when the level reference counter is 1. This may result from a split (i.e., copy) of a dense tree level brought about by creation of the snapshot/clone. Accordingly, a separate reference count is maintained for each extent in the extent store layer to track sharing of extents among volumes.

In an embodiment, the reference counter 734 for level 0 (in a level-0 header) may be incremented, illustratively from value 1 to 2, to indicate that the level 0 array contents are shared by the parent volume and snapshot/clone. Illustratively, the volume superblock of the parent volume (parent volume superblock 760*a*) and a volume superblock of the snapshot/clone (snapshot/clone volume superblock 760*b*) may be updated to point to the level-0 header, e.g., via region key 762*a,b*. Notably, the copies of the in-core data structures may be rendered in conjunction with the merge operation (described with reference to FIG. 11) such that the "merge dense tree 1120" copy of in-core data structures (e.g., the top level 1140 and staging buffer 1130) may become the in-core data structures of the snapshot/clone dense tree by not deleting (i.e., maintaining as active rather than rendering inactive) those copied in-core data structures. In addition, the snapshot/clone volume superblock 760*b* may be created by the volume layer 340 in response to an administrative operation initiated by the administration layer 310. Moreover, snapshots/clones may be hierarchical, in that, a snapshot/clone may be derived from a clone that is itself derived from an original parent volume, i.e., the clone is a parent volume to its "offspring" snapshots (or clones) and the original parent volume is grandparent to the clone's "offspring."

Figure 13:
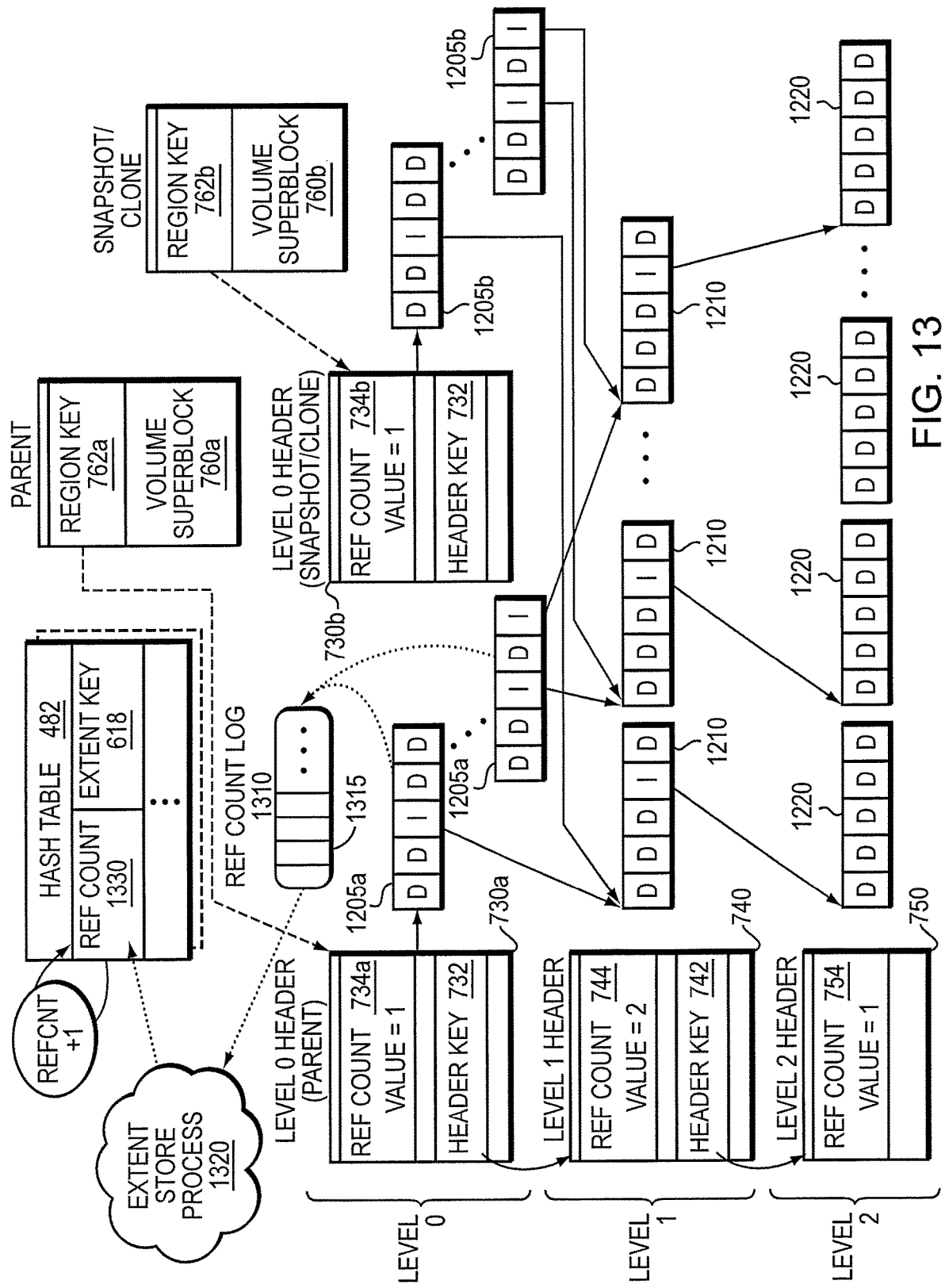
FIG. 13 illustrates diverging of the snapshot/clone from the parent volume.

Over time, the snapshot/clone may split or diverge from the parent volume when either modifies the level 0 array as a result of new I/O operations, e.g., a write request. FIG. 13 illustrates diverging of the snapshot/clone from the parent volume. In an embodiment, divergence as a result of modification to the level 0 array 1205*a* of the parent volume illustratively involves creation of a copy of the on-flash level 0 array for the snapshot/clone (array 1205*b*), as well as creation of a copy of the level 0 header 730*a* for the snapshot/clone (header 730*b*). As a result, the on-flash level 1 array 1210 becomes a shared data structure between the parent volume and snapshot/clone. Accordingly, the reference counters for the parent volume and snapshot/clone level 0 arrays may be decremented (i.e., ref count 734*a* and 734*b* of the parent volume and snapshot/clone level 0 headers 730*a*, 730*b*, respectively), because each level 0 array now has one less reference (e.g., the volume superblocks 760*a* and 760*b* each reference separate level 0 arrays 1205*a* and 1205*b*). In addition, the reference counter 744 for the shared level 1 array may be incremented (e.g., the level 1 array is referenced by the two separate level 0 arrays, 1205*a* and 1205*b*). Notably, a reference counter 754 in the header 750 for the next level, i.e., level 2, need not be incremented because no change in references from level 1 to level 2 have been made, i.e., the single level 1 array 1210 still references level 2 array 1220.

Similarly, over time, level N (e.g., levels 1 or 2) of the snapshot/clone may diverge from the parent volume when that level is modified, for example, as a result of a merge operation. In the case of level 1, a copy of the shared level 1 array may be created for the snapshot/clone such that the on-flash level 2 array becomes a shared data structure between the level 1 array of the parent volume and a level 1 array of the snapshot/clone (not shown). Reference counters 744 for the parent volume level 1 array and the snapshot/clone level 1 array (not shown) may be decremented, while the reference counter 754 for the shared level 2 array may be incremented. Note that this technique may be repeated for each dense tree level that diverges from the parent volume, i.e., a copy of the lowest (leaf) level (e.g., level 2) of the parent volume array may be created for the snapshot/clone. Note also that as long as the reference counter is greater than 1, the data contents of the array are pinned (cannot be deleted).

Nevertheless, the extents for each data entry in the parent volume and the snapshot/clone (e.g., the level 0 array 1205*a,b*) may still have two references (i.e., the parent volume and snapshot/clone) even if the reference count 734*a,b* of the level 0 header 730*a,b* is 1. That is, even though the level 0 arrays (1205*a* and 1205*b*) may have separate volume layer references (i.e., volume superblocks 760*a* and 760*b*), the underlying extents 470 may be shared and, thus, may be referenced by more than one volume (i.e., the parent volume and snapshot/clone). Note that the parent volume and snapshot/clone each reference (initially) the same extents 470 in the data entries, i.e., via extent key 618 in data entry 610, of their respective level 0 arrays 1205*a,b*. Accordingly, a reference counter associated with each extent 470 may be incremented to track multiple (volume) references to the extent, i.e., to prevent inappropriate deletion of the extent. Illustratively, a reference counter associated with each extent key 618 may be embodied as an extent store (ES) reference count (refcount) 1330 stored in an entry of an appropriate hash table 482 serviced by an extent store process 1320. Incrementing of the ES refcount 1330 for each extent key (e.g., in a data entry 610) in level 0 of the parent volume may be a long running operation, e.g., level 0 of the parent volume may contain thousands of data entries. This operation may illustratively be performed in the background through a refcount log 1310, which may be stored persistently on SSD.

Illustratively, extent keys 618 obtained from the data entries 610 of level 0 of the parent volume may be queued, i.e., recorded, by the volume metadata process 710 (i.e., the volume layer instance servicing the parent volume) on the refcount log 1310 as entries 1315. Extent store process 1320 (i.e., the extent store layer instance servicing the extents) may receive each entry 1315 and increment the refcount 1330 of the hash table entry containing the appropriate the extent key. That is, the extent store process/instance 1320 may index (e.g., search using the extent metadata selection technique 480) the hash tables 482*a-n* to find an entry having the extent key in the ref count log entry 1315. Once the hash table entry is found, the refcount 1330 of that entry may be incremented (e.g., refcnt+1). Notably, the extent store instance may process the ref count log entries 1315 at a different priority (i.e., higher or lower) than "put" and "get" operations from user I/O requests directed to that instance.

Data Replication

Figure 14:
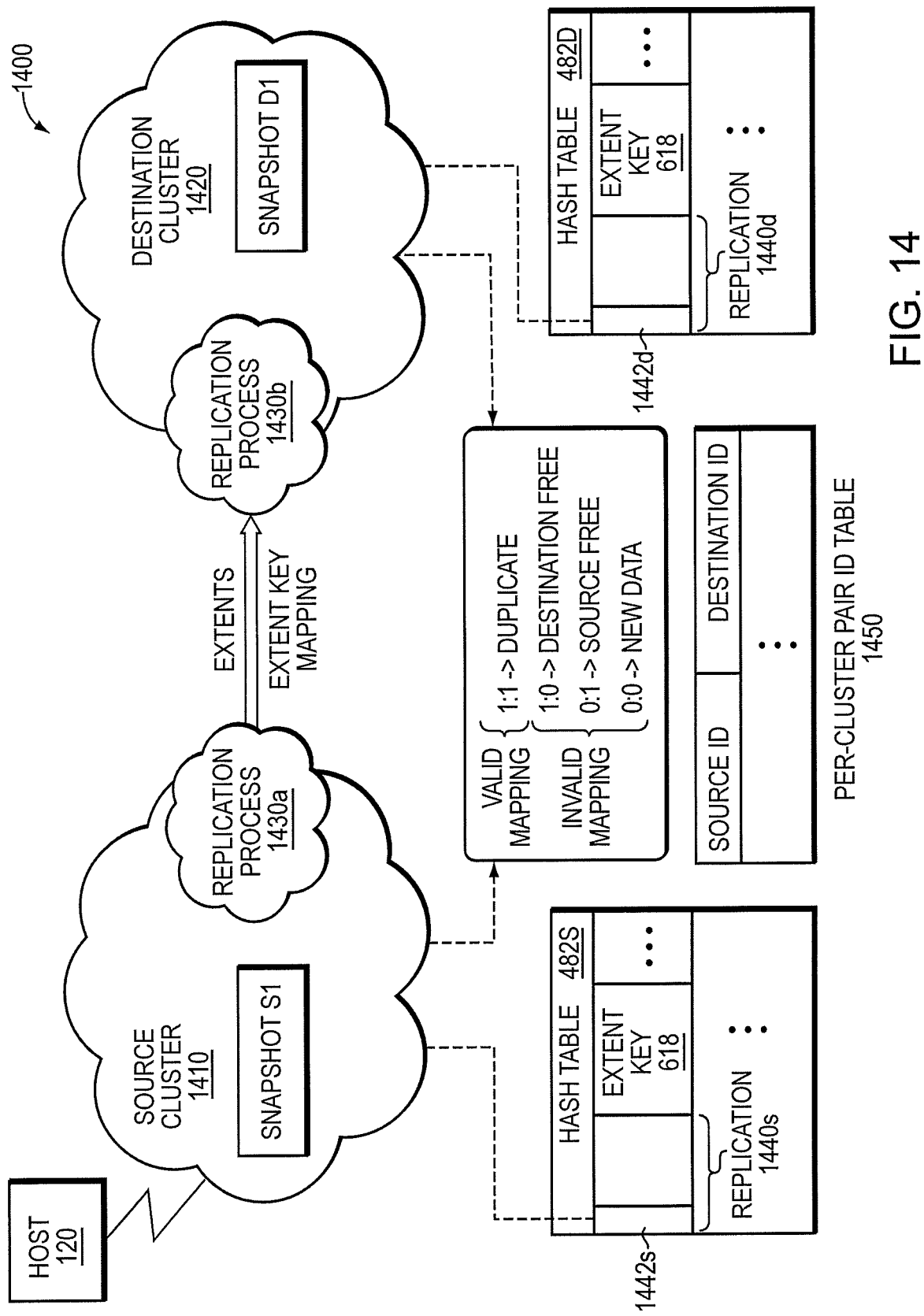
FIG. 14 is a block diagram of a technique for preserving efficiency of replication between a source cluster and destination cluster of a clustered network.

The embodiments herein are directed to a technique for preserving efficiency for replication of data between a source node of a source cluster and a destination node of a destination cluster of a clustered network. FIG. 14 is a block diagram of a technique for preserving efficiency of replication between a source cluster 1410 (i.e., a first cluster 100) and destination cluster 1420 (i.e., a second cluster 100) of a clustered network 1400.

Data replication in the clustered network 1400 may be performed by the replication layer 315, which leverages global in-line deduplication of the clusters to identify and avoid copying duplicate data from the source cluster (source) to the destination cluster (destination). To ensure that the copy of the data on the destination is synchronized with the data received at the source, the replication layer 315 of the source may create a snapshot S1 of the data that is copied to the destination for use as a baseline snapshot D1 at the destination. Thereafter, new data received at the source that differs from the baseline snapshot S1 are transmitted and copied to the destination.

As previously noted, the new data may be data associated with one or more write requests (i.e., write data) issued by a host and directed to a LBA range of a LUN served by the source and associated with the snapshot S1. The write data may be organized, e.g., aggregated, into one or more extents, which may be de-duplicated in-line, as noted. A hash function may be applied to each extent to generate an extent key that is stored in an ES hash table of each cluster. The extent key is configured to reference a location of the extent on one or more storage devices, such as SSDs 260 of the cluster. As such, replication illustratively occurs between two different extent stores on different (e.g., source and destination) clusters, each using the same extent keys, i.e., a same hash function is used on both clusters. Note that the hash function on each cluster may employ a same hash algorithm, but with different parameters (e.g., a different salt) or a different hash algorithm; in both cases the hash space between the source and destination differs such that duplicates may not be avoided (i.e., the same extent key may map to different extents in the source cluster than in the destination cluster).

To preserve efficiency during data replication, a replication process 1430*a,b* at each node (i.e., source and destination) of each cluster 1410, 1420 negotiate (e.g., during an initialization stage of replication) to ensure that the same hash function is used by the source and destination. In addition, the replication processes 1430*a,b* of the source and destination nodes negotiate to establish a mapping of name-to-data when transferring data (i.e., an extent) between the clusters. Illustratively, the name is the extent key for the extent, such that the negotiated mapping established by the source and destination is based on the extent key associated with the extent. To avoid name collisions, the source (i.e., replication process 1430*a*) sends the extent along with the extent key (i.e., name) to the destination (i.e., replication process 1430*b*) for the first transfer of new data to verify the association (i.e., mapping) of the key to the extent. The destination (i.e., replication process 1430*b*) accepts the mapping if it can use the extent key-to-extent association (i.e., as a new mapping or as a duplicate of an existing mapping). The mapping may be considered valid and in effect when the source and destination agree on the association, and may be considered invalid when, e.g., the extent is deleted either by the source or destination. The extent is considered duplicate when there is an existing mapping associated with the extent key of the extent.

In an embodiment, a replication field 1440 is provided within each entry of the ES hash table 482, wherein the replication field is associated with an extent of the respective entry. The replication field is illustratively associated on a per-cluster pair, e.g., between the source and destination clusters, and includes one or more replication bits 1442 organized as a bit plane, e.g., one byte (8 bits) per entry of the ES hash table, wherein each bit represents a per-cluster pair replication relationship, e.g., up to 8 replication relationships may be represented using a one byte replication field. Illustratively, each replication bit 1442*s* of the bit plane on the source is thus linked to a particular destination cluster, which may be indicated using an associated cluster identifier, e.g., a first replication (ID) bit may correspond to destination cluster identifier (ID) X and a second bit may correspond to destination cluster ID Y. That is, the first replication bit represents a "Source-X" per-cluster pair replication relationship, whereas the second replication bit represents a "Source-Y" per-cluster pair replication relationship. To that end, a per-cluster pair ID table 1450 may be maintained in each cluster 1410, 1420 to identify source and destination clusters.

In an embodiment, a mapping of extent key to extent may be established when the source sends the extent key along with the extent to the destination, and the destination stores the extent with the same extent key or already has the same extent stored under the same key. In response, the source and destination may assert (e.g., set) their replication bits (e.g., to 1) 1442*s,d* in their respective replication fields 1440*s,d* of the ES hash table entries for the corresponding extent key 618. Notably, assertion of corresponding replication bits at the source and destination indicates that any further extents associated with the extent key may be considered duplicate. Each replication bit may be (implicitly) unasserted (e.g., cleared) when either the source or destination deletes the extent and the extent key, such that the ES entry for the key does not exist. Accordingly, if either the source or the destination deletes the extent, the associated extent key and corresponding replication bit are implicitly cleared, since the ES hash table entry for the extent key no longer exists, i.e., the key is removed from the entry. Once the replication bits are cleared, the extent key (and ES hash table entry) can be reused for the same or different extent.

In an embodiment, when the replication bit on the source is already asserted (e.g., set), the source first sends the key to the destination before sending the extent. In all other cases (i.e., when the replication bit on the source is not asserted), the source sends the extent along with the extent key to the destination. Accordingly, when the corresponding replication bits are asserted (e.g., set) for a given extent key in each ES hash table (i.e., in the source ES hash table and the destination ES hash table), the source and destination agree that the same extent key is used for the same extent between the clusters. Thus, a valid mapping of key-to-extent is established between the source and destination clusters. Illustratively, any other arrangement of the replication bits (e.g., at least one bit un-asserted) requires renegotiation between the source and the destination to establish (or re-establish) the mapping of that extent key to the extent, i.e., the mapping of key-to-extent is invalid. The various arrangements of the replication bits at the source (i.e., source bit) and the destination (destination bit) are illustratively as follows.

Source Bit 0/Destination Bit 0:

New write data arrives at the source that is not part of the baseline snapshot as copied from the source to the destination. In an embodiment, the source determines that the data is new by computing an extent key from the data (extent), passing the computed key to the extent store (via a put operation) and determining that the computed key does not match an extent key stored in any entry of the ES hash table of the source cluster. Since the extent is new (i.e., not yet copied to the destination) the source sends the extent along with the computed key (source extent key) to the destination. The destination stores the extent on SSD in accordance with I/O write path 400, wherein the extent is hashed to compute (generate) an extent key and the generated key (destination extent key) is stored in a corresponding entry of the ES hash table at the destination. The destination compares the destination extent key with the source extent key to determine if they match. If the destination extent key matches the source extent key, a mapping is established and the destination asserts its replication bit to 1 and notifies the source to set its replication bit to 1. In response, the source asserts its replication bit to 1. Accordingly, if a same hash function is used on both the source and destination clusters, the extent keys should match. However if the destination uses a different hash function, e.g., salts the hash function, then extent keys may not match and duplication of data (extents) may not be avoided.

Source Bit 1/Destination Bit 1:

Write data arrives at the source that is a duplicate of the data (extent) previously copied from the source to the destination. The duplicate extent is determined by matching the source extent key computed from the extent with an extent key stored in an entry of the ES hash table on the source, and detecting an asserted corresponding replication bit in the ES hash table entry. Accordingly, the source only sends the source extent key (without the extent) to the destination, which checks the value of its corresponding replication bit. In an embodiment, the source extent key is passed (via a put operation) to the extent store and, if the source extent key matches a destination extent key stored in an entry of the ES hash table at the destination, the extent store asserts the corresponding replication bit and returns the destination extent key to the volume layer for insertion into a dense tree of the LUN associated with the destination according to a subsequent response from the source. The destination then notifies the source that the mapping for the extent key is valid and agreed upon. In response, the source sends a reference (e.g., LBA range of the extent) for the source extent key to the destination, wherein the LBA range is the location (address) within the LUN where the extent resides. The destination then inserts the key into the dense tree using offset and length parameters corresponding to the LBA range (i.e., reference) sent from the source. Notably the extent is not sent from the source to the destination, thereby avoiding forwarding of duplicate data.

In an embodiment the reference count for the extent key is not synchronized at the source and destination because it is possible that either (or both) the destination and/or the source use the same key to store non-replicated data (primary data). To that end, replication in accordance with the technique described herein is "logical" replication, which may be performed on a per-volume (e.g., per-LUN) basis. The LBA range is needed to ensure insertion of the extent key with appropriate parameters into the dense tree (metadata mapping) of the volume layer. In other words, the replication technique described herein may be performed at a LUN granularity instead of an entire extent store.

Source Bit 0/Destination Bit 1:

A previous mapping exists and the source "frees" the extent or reuses the extent key. As such, the value of the source replication bit is cleared (0) (unasserted). When "new" data arrives, the source sends the data (extent) and source extent key to the destination. The extent is hashed to compute the destination extent key and, since the extent is previously stored on SSD, the corresponding replication bit is already asserted in an entry of the ES hash table associated with the extent. The destination may then compare the destination extent key with the source extent key to determine if they match. If the source extent key matches the destination extent key, a mapping is established and the destination notifies the source to set its corresponding replication bit, e.g., to 1. Upon the source asserting its bit to 1, the mapping is reestablished. However if the destination extent key does not match the source extent key, the destination clears its bit, e.g., to 0, and no mapping is established.

Source Bit 1/Destination Bit 0:

A previous mapping exists and the destination frees the extent or reuses the extent key. As such, the value of the source replication bit is 1 and the value of the destination replication bit is 0. Accordingly the source only sends the source extent key (without the extent) to the destination. Upon receiving the source extent key, the destination checks the value of its corresponding replication bit within an ES entry of the hash table to discover that there is no matching key in any entries of the hash table (i.e., the extent is freed or deleted) or that the value of the corresponding replication bit is 0 (i.e., the key is reused). The destination notifies the source that the mapping for the extent key is invalid and, in response, the source sends the extent and source extent key to the destination, which stores the extent and generates a destination extent key. If the destination extent key and the source extent key match, the destination asserts its replication bit, e.g., to 1; otherwise the destination notifies the source to clear its bit, e.g., to 0. Note that the destination may check the value of its replication bit by first searching the ES hash table to match the destination extent key with an entry of the ES hash table and, if it finds a matching entry, may check the replication bit field.

As described herein, each arrangement of replication bits used to determine whether a mapping is established during replication of data (extents) involves multiple workflow steps. If a failure (crash) arises during the workflow, e.g., between second and third steps of the workflow, such that the steps do not complete, transactional semantics are not required to ensure that a mapping may be reestablished without harm. An example of the transaction semantics involves setting of the replication bits on both the source and destination. Illustratively, setting of the replication bits may occur in any order since a mapping is not established until both bits are set (asserted). For example, assume that during the process of establishing a mapping for a first operation, a second operation starts on the same extent key. The second operation may continue as if the mapping is not established. Alternatively, the second operation may wait until the first operation completes.

Another example involves clearing of the replication bits on the source and destination. According to the technique, the replication bits are cleared implicitly in response to deletion of the extent and extent key since the replication bit field is included within the same data structure (i.e., the same entry of the ES hash table) as the key. Use of a single data structure (i.e., replication field of hash table entry) avoids the need for an explicit atomic transaction, as atomicity is assured, i.e., replication bit is cleared when the extent key (extent) is deleted.

Yet another example involves preventing deletion of the extent key during transfer of a reference. Since extent key mapping is established by providing the (baseline) snapshot from the source to the destination, a simple scheme may be followed that disallows snapshot deletion during reference transfer to thereby prevent deletion of the extent key. If extent key deletion is allowed, extent (data) sharing fails and the extent is resent (recopied). Illustratively, the snapshot on the source (the source snapshot) is locked during transfer of the reference, so the ES key deletion cannot occur on the source.

As described previously herein, the replication relationship illustratively occurs from source to destination with the source sending differences (i.e., extent deltas) from the baseline snapshot. However, the replication relationship is a unidirectional "push" of changes (i.e., differences) from a first node to a second node that share a baseline snapshot. The source and destination may be understood as peers where a flow of information (i.e., extent deltas) designates which peer is the source and which is the destination. For example, in another embodiment, synchronization may be performed in reverse, i.e., from a prior designated destination to a prior designated source. Reversing of the relationship may be performed by a resynchronize (resync) operation. For example, in response to the prior source (new destination) becoming nonfunctional and going offline, an application (host) may be directed to use data at the prior destination (new source) as a result of the logical replication. As such, the client may direct its I/O requests (including write requests having new data) to the new source (prior destination). When the new destination (prior source) recovers and comes back online, the replication relationship may be reversed such that the new source (prior destination) sends more recent extent changes (i.e., the new data) to the new destination (prior source) in accordance with the resync operation. According to the technique, the mapping information is symmetric since the only replication bit arrangement for an agreed-upon mapping is when both replication bits are asserted (e.g., 1:1).

In an embodiment, replication may be cascaded which may involve an arrangement of three (3) clusters, e.g., A, B, and C. Assume source A establishes a mapping with destination B (i.e., per-cluster pair A:B) and the source B establishes a replication mapping with destination C (i.e., per-cluster pair B:C), such that cluster B has two replication bit fields (one for replication between clusters A and B and another for replication between clusters B and C). If cluster B is removed from the replication arrangement, a replication relationship between clusters A and C may be created without expressly establishing mappings between A and C. For example, assume a mapping is established for an extent key between clusters A and B such that their corresponding replication bits are asserted (e.g., to 1). In addition, an agreed-upon mapping is established for the same extent key between clusters B and C such that their replication bits are asserted. When cluster B is removed, clusters A and C may continue the mapping using the same bit planes (i.e., replication bits) for the same extent key, e.g., both replication bits are asserted. Accordingly, the replication technique may be used to establish distributed relationships without additional transfer of replication data, e.g., replication relationships A:B and B:C may be used to establish replication "distributed" relationship A:C without additional cost.

Notably, a replication relationship may be broken prior to serving I/O requests at the destination to ensure that there are no further transfers, i.e., the destination is writable and able serve host I/O requests. Upon breaking of the replication relationship (and prior to serving the I/O requests), the resync operation may be invoked. When breaking the replication relationship, there is no need to clear the replication bit plane since those bits may be used for the resync operation (as described above). Alternatively, to completely unconfigure the replication relationship between the source and destination, the replication bit plane may be cleared so to enable establishment of another replication relationship between a cluster pair.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving first and second write requests, the first write request having a data and a first logical block address (LBA), the second write request having the data and a second LBA different from the first LBA, the write requests processed at a source storage system;
   applying a hash function to the data to generate a first key;
   associating the first key with a replication value and the first LBA;
   de-duplicating the data by associating the first key with the second LBA;
   sending the first key and the data to a destination storage system;

in response to the destination storage system notifying the source storage system that the first key is matched at the destination storage system, asserting the replication value to establish a mapping of the first key to the data between the source storage system and the destination storage system;

sending the first key to the destination storage system to duplicate the data at the destination storage system;

deleting the data from the source storage system by unassociating the first key with a location of the data on a storage device connected to the source storage system;

in response to deleting the data, unasserting the replication value to invalidate the established mapping of the first key to the data;

associating the first key with the unasserted replication value; and sending the first key and the data to the destination storage system.

2. The method of claim 1, wherein the response to the destination storage system notifying the source storage system that the first key is matched further comprises:
sending the second LBA to the destination storage system.

3. The method of claim 1 further comprising:
in response to the destination storage system notifying the source storage system that the first key is not matched, invalidating the established mapping of the first key to the data.

4. The method of claim 3 further comprising:
associating the established mapping of the first key to the data with a first cluster identifier of source storage system and with a second cluster identifier of the destination storage system.

5. The method of claim 4 wherein the source storage system is included in a first cluster and the destination storage system is included in a second cluster, and wherein the first cluster applies the hash function and the second cluster applies a different hash function.

6. The method of claim 1 further comprising:
applying the hash function to the data at the destination storage system to generate a second key; and
in response to matching the first key with the second key at the destination storage system, sending the notification to the source storage system that the first key is matched.

7. The method of claim 1 further comprising:
in response to a resynchronization operation, receiving at the source storage system, the first key associated with the data from the destination storage system;
determining whether the replication value associated with the first key is asserted;
in response to determining that the replication value is asserted, notifying the destination storage system that the first key is matched; and
refraining at the destination storage system from sending the data to the source storage system.

8. The method of claim 1, wherein the source storage system maintains the first key, a location of the data on a storage device connected to the storage system and the replication value in an entry of a hash table stored in a memory of the source storage system.

9. A method comprising:
receiving a first write request having a data and a first logical block address (LBA), the first write request processed at a source storage system;
associating a hash of the data with the LBA;
sending the hash and the data to a destination storage system;
in response to the destination storage system notifying the source storage system that the hash is matched at the destination storage system, establishing a replication pair between the source and destination storage systems for the hash by setting a replication bit;
receiving a second write request having the data and a second LBA different from the first LBA;
de-duplicating the data by associating the hash with the second LBA;
sending the hash and the second LBA to the destination storage system to duplicate the data at the destination storage system;
delete the data from the source storage system by unassociating the hash with a location of the data on a storage device connected to the source storage system;
in response to deletion of the data, unassert the replication value to invalidate the established mapping of the hash to the data;
associate the hash with the unasserted replication value; and
send the hash and the data to the destination storage system.

10. A system comprising:
a source storage system having a memory connected to a processor;
a storage I/O stack executing on the processor of the storage system, the storage I/O stack configured to:
receive a first write request having a data and a first logical block address (LBA);
apply a hash function to the data to generate a key;
associate the key with a replication value and the first LBA;
send the key and the data to a destination storage system;
in response to the destination storage system notifying the source storage system that the key is matched at the destination storage system, assert the replication value to establish a mapping of the key to the data between the source storage system and the destination storage system;
receive a second write request having the data and a second LBA different from the first LBA;
de-duplicate the data by associating the key with the second LBA;
send the key to the destination storage system to duplicate the data at the destination storage system;
delete the data from the source storage system by unassociating the key with a location of the data on a storage device connected to the source storage system;
in response to deletion of the data, unassert the replication value to invalidate the established mapping of the key to the data;
associate the key with the unasserted replication value; and
send the key and the data to the destination storage system.

11. The system of claim 10 wherein the storage I/O stack is further configured to:
send the second LBA to the destination storage system.

12. The system of claim 10 wherein the storage I/O stack is further configured to:
in response to the destination storage system notifying the source storage system that the key is not matched, unassert the replication value to invalidate the established mapping of the key to the data.

13. The system of claim 12 wherein the storage I/O stack is further configured to:
send the second LBA to the destination storage system.

14. The system of claim 10 wherein the source storage system is included in a first cluster and the destination storage system is included in a second cluster, and wherein the first cluster applies the hash function and the second cluster applies a different hash function.

15. The system of claim 14 wherein the first cluster and the second cluster globally de-duplicate the data.

16. The system of claim 10 wherein the storage I/O stack is further configured to:
in response to a resynchronization operation, receive at the source storage system, a new key associated with new data from the destination storage system;
determine whether a new replication value associated with the new key in the memory of the source storage system is asserted;
in response to determining that the new replication value is not asserted, acknowledge to the destination storage system that the key does not match;
receive the new data from the destination storage system; and
associate the new key with the new data and store the new data at the source storage system.

17. The system of claim 10, wherein the source storage system maintains the key, a location of the data in a storage device connected to the source storage system and the replication value in an entry of a hash table stored in the memory of the source storage system.

18. The system of claim 17, wherein the entry of the hash table includes the replication value represented by a predetermined bit of a plurality of bits, and wherein the predetermined bit represents the validity of the mapping of the key to the data between the source and destination storage systems.

* * * * *